(12) United States Patent
Tanaka

(10) Patent No.: US 12,208,794 B2
(45) Date of Patent: Jan. 28, 2025

(54) VEHICLE CONTROL APPARATUS

(71) Applicant: TOYOTA JIDOSHA KABUSHIKI KAISHA, Toyota (JP)

(72) Inventor: Yusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/174,237

(22) Filed: Feb. 24, 2023

(65) Prior Publication Data

US 2024/0017722 A1 Jan. 18, 2024

(30) Foreign Application Priority Data

Mar. 14, 2022 (JP) ................ 2022-038843

(51) Int. Cl.
*B60W 30/12* (2020.01)
*B60W 10/20* (2006.01)
*B60W 30/14* (2006.01)
*B60W 50/00* (2006.01)
(Continued)

(52) U.S. Cl.
CPC ........... *B60W 30/12* (2013.01); *B60W 10/20* (2013.01); *B60W 30/143* (2013.01); *B60W 50/0097* (2013.01); *B60W 60/001* (2020.02); *B60W 10/18* (2013.01); *B60W 2420/403* (2013.01);
(Continued)

(58) Field of Classification Search
CPC . B60Q 1/44; B60Q 1/46; B60Q 1/525; B60Q 1/544; B60Q 5/006; B60W 10/18; B60W 10/20; B60W 2050/143; B60W 2420/403; B60W 2520/125; B60W 2540/229; B60W 2540/26; B60W 2552/15; B60W 2552/30; B60W 2552/53; B60W 2720/106; B60W 30/12; B60W 30/143; B60W 30/18145; B60W 50/0097; B60W 50/14; B60W 60/001; G06V 20/588; G08G 1/167
See application file for complete search history.

(56) References Cited

U.S. PATENT DOCUMENTS

| 10,166,866 B2 | 1/2019 | Otake |
| 10,220,825 B2 | 3/2019 | Otake et al. |
| 10,239,537 B2 | 3/2019 | Otake |

(Continued)

FOREIGN PATENT DOCUMENTS

| JE | 4929777 B2 | 5/2012 |
| JP | 2006-315491 A | 11/2006 |

(Continued)

*Primary Examiner* — Carl C Staubach
(74) *Attorney, Agent, or Firm* — Sughrue Mion, PLLC

(57) ABSTRACT

A vehicle control apparatus determines whether or not a confirmed abnormal state in which it can be confirmed that a driver of a vehicle has fallen into an abnormal state where he/she is unable to drive the vehicle is occurring. When it is determined that the confirmed abnormal state is occurring, the apparatus decelerates the vehicle at a normal deceleration DGnor. However, when it is predicated that a control limit of a lane keeping control will come before the vehicle stops in the case where the vehicle is decelerated at the normal deceleration DGnor from when the confirmed abnormal state is determined to be occurring, the apparatus decelerates the vehicle at a maximum deceleration DGmax greater than the normal deceleration.

5 Claims, 17 Drawing Sheets

(51) Int. Cl.
  *B60W 60/00* (2020.01)
  *B60W 10/18* (2012.01)
(52) U.S. Cl.
  CPC ... *B60W 2540/229* (2020.02); *B60W 2552/53* (2020.02)

(56) References Cited

U.S. PATENT DOCUMENTS

| | | | |
|---|---|---|---|
| 10,589,743 B2 | 3/2020 | Otake | |
| 11,021,156 B2 | 6/2021 | Uejima | |
| 11,110,934 B2 | 9/2021 | Watanabe et al. | |
| 11,180,163 B2* | 11/2021 | Naruse | B60W 60/0016 |
| 11,299,153 B2 | 4/2022 | Tanaka | |
| 11,598,279 B2* | 3/2023 | Miyagawa | B60W 30/18018 |
| 11,787,408 B2* | 10/2023 | Sim | B60W 50/10 701/28 |
| 2005/0270145 A1 | 12/2005 | Kataoka et al. | |
| 2006/0025918 A1 | 2/2006 | Saek | |
| 2013/0093582 A1* | 4/2013 | Walsh | G08G 1/166 340/436 |
| 2017/0232973 A1 | 8/2017 | Otake | |
| 2017/0297567 A1* | 10/2017 | Matsumura | B60W 40/08 |
| 2018/0037216 A1* | 2/2018 | Otake | B60W 30/18109 |
| 2018/0037226 A1* | 2/2018 | Otake | B60K 28/06 |
| 2019/0039617 A1* | 2/2019 | Miura | B60W 30/165 |
| 2020/0307642 A1* | 10/2020 | Tsuji | B60W 10/04 |
| 2020/0353925 A1* | 11/2020 | Kim | B60W 40/08 |
| 2021/0362729 A1 | 11/2021 | Watanabe et al. | |
| 2022/0105908 A1* | 4/2022 | Hamada | B60K 28/06 |
| 2022/0227372 A1* | 7/2022 | Nilsson | G05D 1/0212 |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 2013-152700 A | 8/2013 |
| JP | 2014-148293 A | 8/2014 |
| JP | 2017-144808 A | 8/2017 |
| JP | 2017-190048 A | 10/2017 |
| JP | 2021-014232 A | 2/2021 |

* cited by examiner

VEHICLE CONTROL APPARATUS

TECHNICAL FIELD

The present disclosure relates to a vehicle control apparatus configured to decelerate a vehicle to stop the vehicle when a driver falls into a state in which he/she is unable to drive the vehicle.

BACKGROUND

There has been proposed a known apparatus configured to determine whether or not a driver has fallen into an abnormal state in which he/she is unable to drive the vehicle, and to decelerate the vehicle to stop the vehicle when it is determined that the driver has fallen in the abnormal state. The abnormal state is, for example, a state in which he/she has lost an ability to drive the vehicle, and may include a drowsy driving state and a failure state of brain and/or body function. For example, one of such apparatuses (hereinafter, referred to as a conventional apparatus) performs a lane keeping control, a deceleration control, and a warning control, when it is determined that the driver has fallen into the abnormal state while the lane keeping control is being executed (refer to Japanese Patent Application Laid-Open No. 2017-144808 (e.g., paragraphs to [0086]).

The lane keeping control is a control to automatically change a steered wheel angle of a vehicle to let the vehicle travel along a traveling lane (in which the vehicle is traveling). The deceleration control is a control to decelerate the vehicle to stop the vehicle. The warning control is a control to issue a warning/alert inside and outside of the vehicle, using a sound and/or a light.

SUMMARY

Meanwhile, the lane keeping control is automatically stopped/canceled, for example, when a lateral acceleration of the vehicle exceeds a predetermined control limit lateral acceleration in a case where the traveling lane is a curve. In a case in which the lane keeping control is to be stopped/canceled occurs, the conventional apparatus stops/cancels not only the lane keeping control but also the deceleration control and the warning control, even when it is determined that the driver has fallen in the abnormal state. In other words, despite that it is determined that the driver has fallen in the abnormal state, the conventional apparatus may not be able to utilize the determination.

The present disclosure is made to cope with the problem described above. That is, one of objectives of the present disclosure is to provide a vehicle control apparatus capable of utilizing the determination that the driver has fallen in the abnormal state, even in the case where the lane keeping control is automatically stopped/canceled because of the control limit of the lane keeping control.

One of embodiments of the vehicle control apparatus according to the present disclosure comprises:

- a lane marker information obtaining device (17b), including a camera configured to obtain image data by taking a picture of a scene in front of a vehicle, that obtains, based on the image data, lane marking information including information on a lane marking that defines a traveling lane that is a lane in which the vehicle is traveling and information indicative of a positional relationship in a lane width direction between the lane marking and the vehicle;
- a vehicle speed adjusting actuator (31, 41) configured to change a vehicle speed that is a speed of the vehicle;
- a steering actuator (51, 52) configured to vary a steering angle of the vehicle;
- a traveling state sensor (11, 12, 14, 15, 16, 19a, 19b) configured to obtain a traveling state parameter indicative of a traveling state of the vehicle;
- a driver state sensor (11, 12, 13, 14, 15, 80) configured to obtain a driver state parameter indicative of a state of the driver of the vehicle:
- a position information obtaining device (20, 21) configured to obtain a present position parameter indicative of a present position of the vehicle;
- a lane information obtaining device (20, 22) configured to obtain, based on the present position of the vehicle, lane information including a parameter indicative of a shape of the traveling lane; and
- a control unit (10, 50) configured to perform a lane keeping control (step 1130) to control the steering actuator based on the lane marking information in such a manner that the vehicle travels along the traveling lane, and to stop performing the lane keeping control (step 1120: Yes, step 1160) when determining, based on at least the traveling state parameter, that a predetermined control limit condition for the lane keeping control becomes satisfied while the lane keeping control is being performed, Furthermore, the control unit is configured to:

determine, based on the driver state parameter, whether or not a confirmed abnormal state in which it can be confirmed that the driver has fallen into an abnormal state where the driver is unable to drive the vehicle has been occurring (step 665), when it is determined that the confirmed abnormal state has been occurring, predict, based on the traveling state parameter, the present position parameter, and the lane information, whether or not a specific state in which the control limit condition is satisfied before the vehicle completely stops in a case where the vehicle is decelerated at a first deceleration will occur (step 850, step 1220);

when it is predicted that the specific state will occur, control the vehicle speed adjusting actuator in such a manner that the vehicle is decelerated at a second deceleration whose absolute value is greater than an absolute value of the first deceleration (step 850, step 860, step 920, step 1220, step 1240); and when it is predicted that the specific state will not occur, control the vehicle speed adjusting actuator in such a manner that the vehicle is decelerated at the first deceleration (step 850, step 830, step 920, step 1220 and step 1230).

According to this embodiment, when it is determined that the confirmed abnormal state has been occurring, whether or not the specific state in which the control limit condition is satisfied will occur before the vehicle completely stops in the case where the vehicle is decelerated at the first deceleration is predicted (determined). When it is predicted that the specific will not occur, the vehicle is decelerated at the first deceleration. This can avoid excessively rapid deceleration, and can cause the vehicle to travel in the traveling lane by the lane keeping control so as to smoothly be stopped.

Whereas, when it is predicted that the specific will occur, the vehicle is decelerated at the second deceleration whose absolute value is greater than the absolute value of the first deceleration. This can increase a possibility that the vehicle is completely stopped before the lane keeping control is stopped (canceled) In addition, even if the lane keeping control is stopped (canceled) before the vehicle is completely stopped, the vehicle speed can be sufficiently lowered by the time at which the lane keeping control is stopped. Therefore, safety can be enhanced.

In some embodiments,
the control unit is configured to:
determine, based on the driver state parameter, whether or not a tentative abnormal state has been occurring, the tentative abnormal state being a state in which it is likely that the driver has fallen into the abnormal state but it cannot be determined that the confirmed abnormal state has been occurring (step 645); and
when it is determined that the tentative abnormal state has been occurring, control the vehicle speed adjusting actuator in such a manner that the vehicle is decelerated at a third deceleration whose absolute value is equal to or smaller than the absolute value of the first deceleration (step 710, step 720, step 920).

According to the above embodiment, the vehicle can be mildly/generously decelerated when it is likely that the driver has fallen into the abnormal state.

In some embodiments,
the control unit is configured to determine whether or not the confirmed abnormal state has been occurring and/or determine whether or not the tentative abnormal state has been occurring, while the lane keeping control is being executed (step 610).

Typically, the driver is required to hold a steering wheel during the lane keeping control is being executed. For instance, it is required that a state where the steering wheel is not held should not continue for a predetermined time, when the lane keeping control is being executed. Thus, according to the above described embodiment, it can be accurately determined whether the confirmed abnormal state and/or the tentative abnormal state has been occurring.

In some embodiments,
the control unit is configured to, even when it is determined that the specific state will not occur, control the vehicle speed adjusting actuator in such a manner that the vehicle is decelerated at the second deceleration (step 1240), when it is predicted that the vehicle will enter a steep ascending slope whose angle of inclination is equal to or greater than a predetermined angle before the vehicle completely stops in a case where the vehicle is decelerated at the first deceleration (step 1610: Yes), and when it is determined that the vehicle can be completely stopped before the vehicle enters the steep ascending slope in a case where the vehicle is decelerated at the second deceleration (step 1620: Yes).

This embodiment can increase a possibility that the vehicle whose driver has fallen into the abnormal state is stopped before the steep ascending slope. Therefore, a possibility that a following vehicle needs to be braked abruptly can be decreased.

Notably, in the above description, in order to facilitate understanding of the present disclosure, the constituent elements or the like of the disclosure corresponding to those of the embodiments of the disclosure which will be described later are accompanied by parenthesized symbols which are used in the embodiments. However, the constituent elements of the disclosure should not be limited to those in the embodiments defined by the symbols.

DETAILED DESCRIPTION

A vehicle control apparatus according to each of embodiments of the present disclosure will be described with reference to the drawings.

First Embodiment

Figure 1:
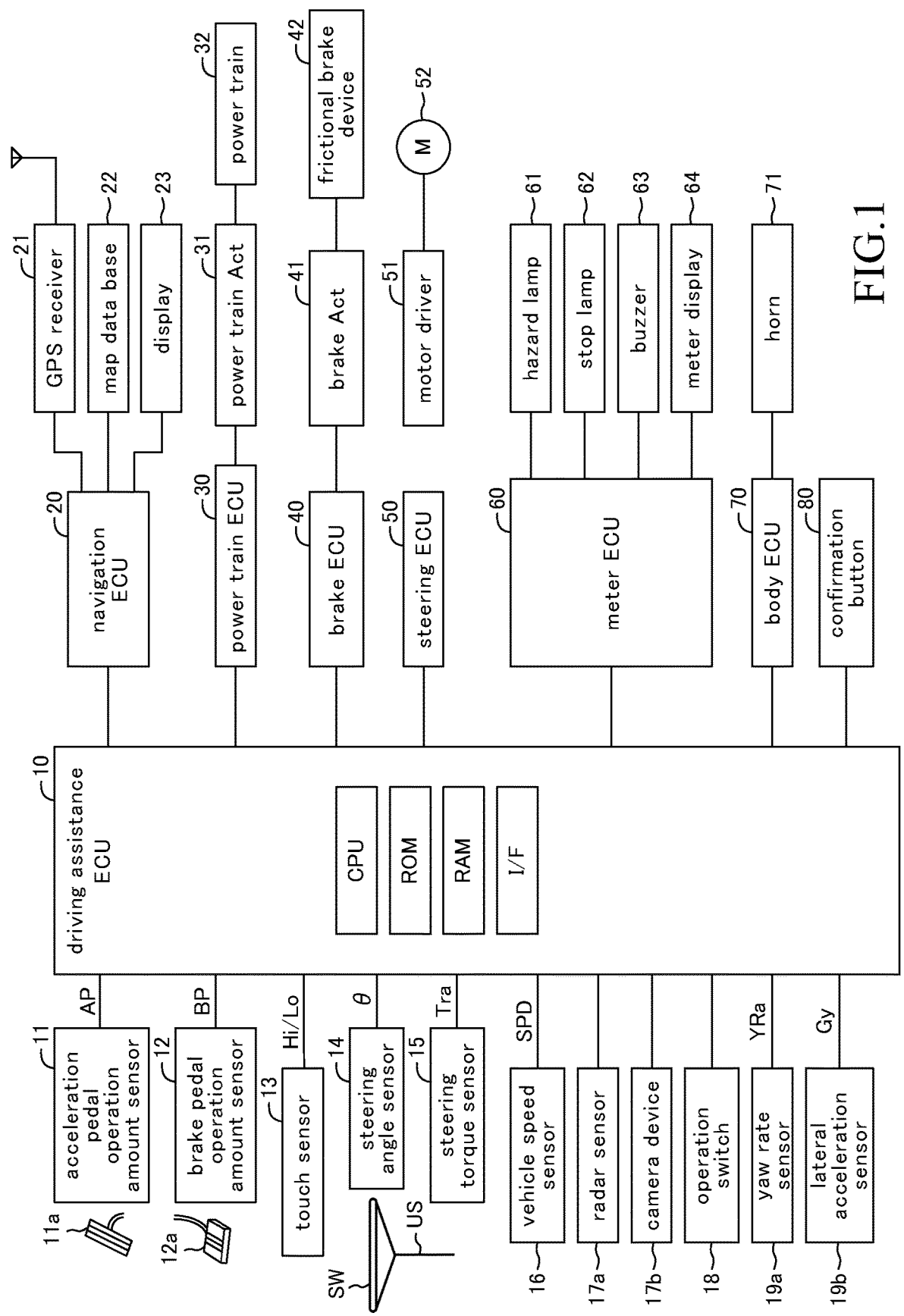
FIG. 1 is a schematic diagram of a vehicle control apparatus (first apparatus) according to a first embodiment of the present disclosure.

A vehicle control apparatus (hereinafter, sometimes referred to as a "first apparatus") according to a first embodiment of the present disclosure is applied to a vehicle (hereinafter, sometimes referred to as a "host vehicle" in order to differentiate the vehicle from other vehicles). As shown in FIG. 1, the first apparatus comprises a driving assistance (vehicle control) ECU 10, a navigation ECU 20, a power train ECU 30, a brake ECU 40, a steering ECU 50, a meter ECU 60, and a body ECU 70.

Each of the ECUs described above is an electronic control circuit including a microcomputer as a main component. The ECU may sometimes be referred to as a "control unit" or a "controller". The ECUs are communicably connected with each other so as to be able to mutually exchange information through a CAN (Controller Area Network). The microcomputer includes a CPU, a ROM, a RAM, a non-volatile memory, and an interface (I/F). The CPU is configured and/or programmed to realize various functions by executing instructions (programs, routines) stored in the ROM. Namely, the CPU is a programmed processor. Some or all of the ECUs and ECUs described later may be integrated into a single ECU.

The driving assistance ECU 10 is connected with the following sensors (including switches), and configured to receive detected signals or output signals of the sensors. It should be noted that each of the sensors may be connected to an ECU other than the driving assistance ECU 10. In such a case, the driving assistance ECU 10 is configured to receive "the detected signals or output signals of the sensors" transmitted from the ECU to which the sensors are connected, through the CAN.

An acceleration pedal operation amount sensor 11 is configured to detect an operation amount of an acceleration pedal 11a of the vehicle (i.e, accelerator position), and to generate a signal indicative of the acceleration pedal operation amount AP.

A brake pedal operation amount sensor 12 is configured to detect an operation amount of a brake pedal 12a of the vehicle, and to generate a signal indicative of the brake pedal operation amount BP.

A touch sensor 13 is configured to generate a high level signal when the driver touches a steering wheel SW, and to generate a low level signal when the driver does not touch the steering wheel SW.

A steering angle sensor 14 is configured to detect a steering angle of the vehicle, and to generate a signal indicative of the steering angle θ.

A steering torque sensor 15 is configured to detect a steering torque acting on a steering shaft US owing to an operation of the steering wheel SW, and to generate a signal indicative of the steering torque Tra.

A vehicle speed sensor 16 is configured to detect a traveling speed of the vehicle, and to generate a signal indicative of the vehicle speed SPD.

A radar sensor 17a is configured to obtain information (hereinafter, referred to as "radar target object information") on a three-dimensional object (target object) that is present on a road in front of the vehicle, using an electric wave in a millimeter band. The radar target object information includes a longitudinal distance Dfx(n) of the target object (n) from the host vehicle, a relative speed Vfx(n) of the target object (n), and an azimuth orientation H(n) of the target object (n).

A camera device 17b comprises an unillustrated stereo camera and an unillustrated image processing section (ECU).

The stereo camera obtains a pair of a left forward image and a right forward image by capturing (taking) an image of a left forward area of the vehicle and an image of a right forward area. Namely, the stereo camera takes a picture of a "scene in a horizontal direction" covered in an angle of view that has a center axis extending along a front-rear direction of the vehicle.

The processing section recognizes a lane marker such as a left white line and a right white line of/on a road, based on the pair of the images taken by the stereo camera. Hereinafter, the lane marker is simply referred to as a white line. The processing section is configured to obtain, based on information on the recognized white line(s), a curvature radius of a lane (hereinafter, referred to as a "traveling lane") in which the vehicle is currently traveling or a curvature of the traveling lane (that is an inverse of the curvature radius), and parameters indicative of a positional relationship in the road/lane width direction between the vehicle and the white line.

Namely, the camera device 17b constitutes a lane marker information obtaining device, including a camera configured to obtain image data by taking a picture of a scene in front of the vehicle, that obtains, based on the image data, lane marking information including the lane marking (white line) that defines the traveling lane in which the vehicle is traveling and information indicative of the positional relationship in the road/lane width direction between the lane marking and the vehicle. It should be noted that the camera device 17b comprises a monocular camera in place of the stereo camera.

An operation switch 18 is a switch to be operated by the driver. The driver can select/determine whether "a lane keeping control (or, LAT: Lane Tracing Assist Control)" described later is executed, by operating the operation switch 18. Further, the driver can select/determine whether "an inter vehicle distance control (a follow-up inter vehicle distance control: ACC: Adaptive Cruise Control)" is executed, by operating the operation switch 18.

The inter vehicle distance control is a control to let the vehicle follow a preceding vehicle (i.e., follow-up target vehicle) traveling immediately ahead of the vehicle while keeping an inter-vehicle distance between the follow-up target vehicle and the host vehicle at a predetermined distance, based on the object information obtained by the radar sensor 17a and the camera device 17b. It should be noted that, the inter vehicle distance control is a control to let the vehicle travel in such a manner that an actual vehicle speed becomes equal to a target vehicle speed, when the follow-up target vehicle is not present. The inter vehicle distance control itself has been well-know, and thus, the details thereof are omitted (e.g., refer to Japanese Patent Application Laid-Open No. 2014-148293, Japanese Patent Application Laid-Open No. 2006-315491, Japanese Issued U.S. Pat. No. 4,172,434, and Japanese Issued U.S. Pat. No. 4,929,777).

A yaw rate sensor 19a is configured to detect a yaw rate of the vehicle, and to generate a signal indicative of an actual yaw rate Ry.

A lateral acceleration sensor 19b is configured to detect a lateral acceleration of the vehicle, and to generate a signal indicative of an actual lateral acceleration Gy.

It should be noted that any one of the following sensors can be a traveling state sensor configured to obtain a traveling state parameter indicative of a traveling state of the vehicle:

the acceleration pedal operation amount sensor 11;
the brake pedal operation amount sensor 12;
the steering angle sensor 14;
the steering torque sensor 15;
the vehicle speed sensor 16;
the yaw rate sensor 19a; and
the lateral acceleration sensor 19b.

In addition, any one of the following sensors can be a driver state sensor configured to obtain a driver state parameter indicative of a (driving) state of the driver of the vehicle:

the acceleration pedal operation amount sensor 11;
the brake pedal operation amount sensor 12;
the touch sensor 13;
the steering angle sensor 14; and
the steering torque sensor 15.

Note that the steering angle sensor does not have to be included as the driver state sensor. Sensors other than sensors described above may be included as the driver state sensor.

The navigation ECU 20 is connected with a GPS receiver 21 for receiving a GPS signal for detecting a position of the vehicle, a map data base 22 storing map information, and a touch panel display 23. The navigation ECU 20 obtains a position (present position) of the vehicle Pnow at the present time point based on the GPS signal, executes various calculation based on the present position Pnow of the vehicle and the map information stored in the map data base 22, and perform a route guidance using a display 23. The position of the vehicle is represented by latitude and longitude. The navigation ECU 20 and the GPS receiver 21 constitute a position obtaining device that obtains a present position parameter indicative of the present position Pnow of the vehicle.

The map information stored in the map data base 22 includes lane information (road information). The lane information includes a parameter indicative of a shape of each section of the lane (road). The parameter indicative of the shape may be, for example, "a curvature radius or a radius of the lane" and a gradient (inclination angle) of the lane.

Thus, the navigation ECU 20 and the GPS receiver 21 constitute a lane information obtaining device configured to obtain lane information including a parameter indicative of a shape of a traveling lane and a parameter indicative of a gradient. The navigation ECU 20 may be configured to obtain the lane information including the parameter indicative of the shape of the traveling lane and the parameter indicative of the gradient, from an exterior device (e.g., information center), using an unillustrated communication device.

The power train ECU 30 is connected with a power train actuator 31. The power train actuator 31 is an actuator configured to control the power train (an internal combustion engine and/or a motor) so as to adjust a driving force transmitted to driven wheels of the vehicle.

The brake ECU 40 is connected with a brake actuator 41. The brake actuator 41 is an actuator configured to control a frictional brake device 42 so as to adjust a brake force (frictional brake force) applied to the vehicle.

It should be noted that the power train actuator 31 and the brake actuator 41 may sometimes be referred to as a vehicle speed adjusting actuator configured to be able to vary/adjust the speed (vehicle speed) of the vehicle.

The steering ECU 50 is a controller for a well-known electric power steering system, and is connected with a motor driver 51. The motor driver 51 is connected with a steering motor 52. The steering motor 52 is incorporated into "a steering mechanism of the vehicle, including a steering wheel, a steering shaft connected to the steering wheel, and steering gear mechanisms". The steering motor 52 generates a torque using an electric power supplied from the motor driver 51 so as to vary a steered angle (steering angle of the vehicle) of the left and right steered wheels with the torque. The motor driver 51 and the steering motor 52 constitute a steering actuator configured to vary the steered angle of the vehicle.

The meter ECU 60 is connected with a hazard lamp 61, a stop lamp 62, a buzzer (interior alert sound generation device 63), and a meter display 64, to control them.

The body ECU 70 is connected with a horn (exterior alert sound generation device) 71.

Furthermore, the driving assistance ECU 10 is connected with a confirmation button 80. The confirmation button 80 is disposed at a position such that the driver can operate. The confirmation button 80 generates a low level signal when it is not operated, and generates a high level signal when it is operated (i.e., pressed or pushed).

(Outline of Operation)

The first apparatus is designed under the assumption that a combination of a straight road and a curved road with a constant curvature radius constitutes a traveling lane (namely, the lane includes only of a straight lane and a curved lane with the constant curvature).

The first apparatus continues determining, based on the driver state parameter obtained by the driver state sensor, whether or not the driver has fallen into a "state (i.e., abnormal state) in which it is inappropriate or impossible for the driver to drive the vehicle (namely, he/she is unable to drive properly)" while the lane keeping control is being executed.

The first apparatus causes the vehicle to gradually decelerate at a minimum deceleration DGmin to stop, when it determines that it is likely that the driver has fallen into the abnormal state (i.e., when a tentative abnormality determination is made), regardless of whether or not the lane keeping control is later stopped/canceled because of the control limit of the lane keeping control.

Figure 2:
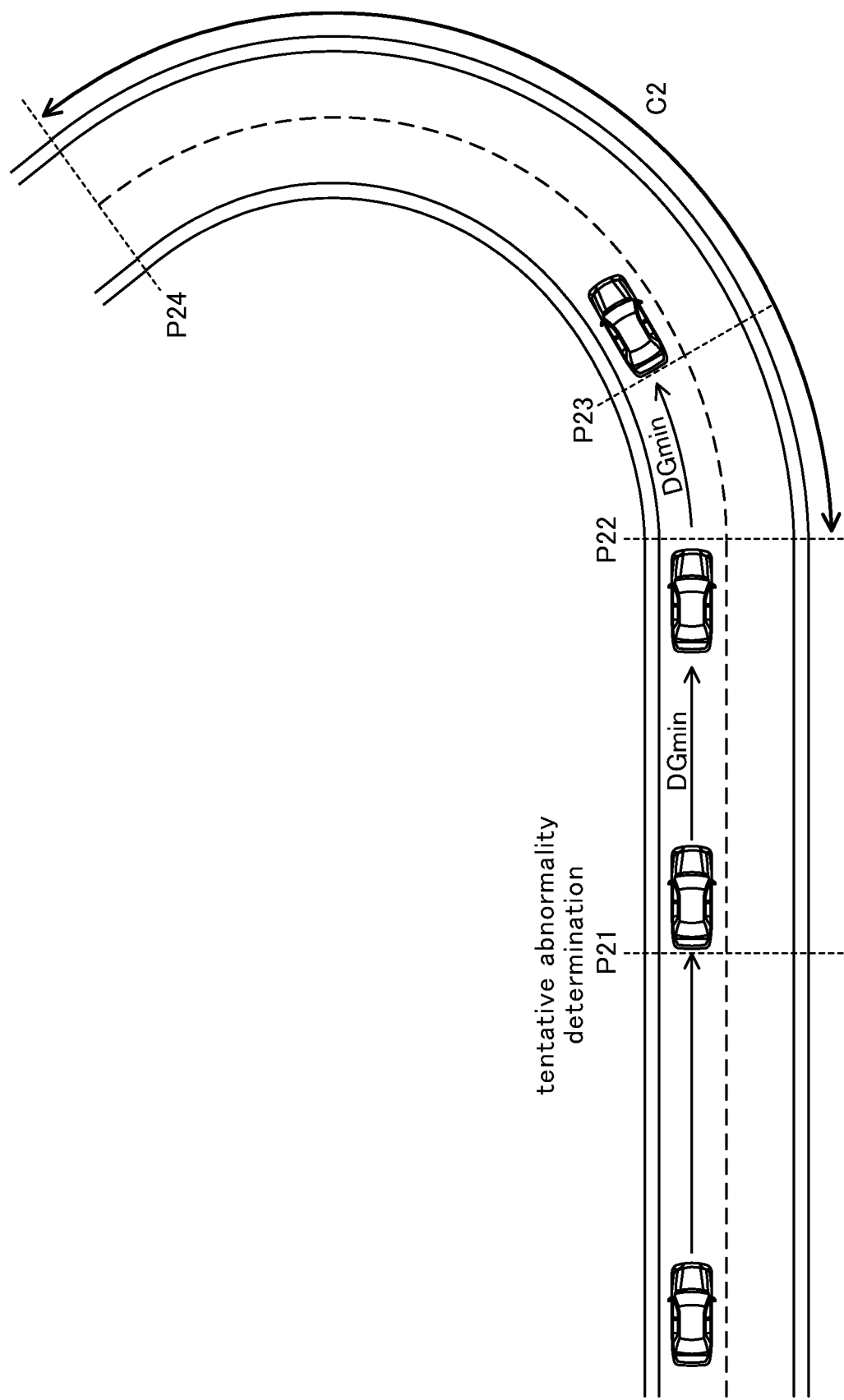
FIG. 2 is a drawing for describing an operation of the first apparatus.

For example, in the example shown in FIG. 2, when the vehicle reaches a point P21, the tentative abnormality determination is made. Thereafter, the vehicle is decelerated at the minimum deceleration DGmin after the vehicle passes the point P21. Thus, the vehicle continues to be decelerated at the minimum deceleration DGmin after the vehicle enters a curved road (lane) C2 from a point P22, and stops at a point P23, in this example. In this case, if the control limit of the lane keeping control has come while the vehicle travels between the point P22 and the point P23, and therefore, even when the lane keeping control is stopped (canceled), the vehicle continues being decelerated at the minimum deceleration DGmin until it completely stops.

The first apparatus continues determining whether or not it can be confirmed that the driver has fallen into the abnormal state (i.e., whether or not the diver has definitely fallen into the abnormal state) after the tentative abnormality determination is made while the lane keeping control is being executed.

When the first apparatus confirmed that the driver has fallen into the abnormal state (i.e., when a confirmed abnormality determination is made, the first apparatus predicts (determines) whether or not the control limit of the lane keeping control will come before a time point at which the vehicle completely stops in a case where the vehicle is decelerated at a "normal deceleration DGnor" that is greater than the minimum deceleration DGmin.

When the first apparatus predicts (determines) that the control limit of the lane keeping control will not come, the first apparatus decelerates the vehicle at the normal deceleration DGnor so as to completely stop the vehicle.

Figure 3:
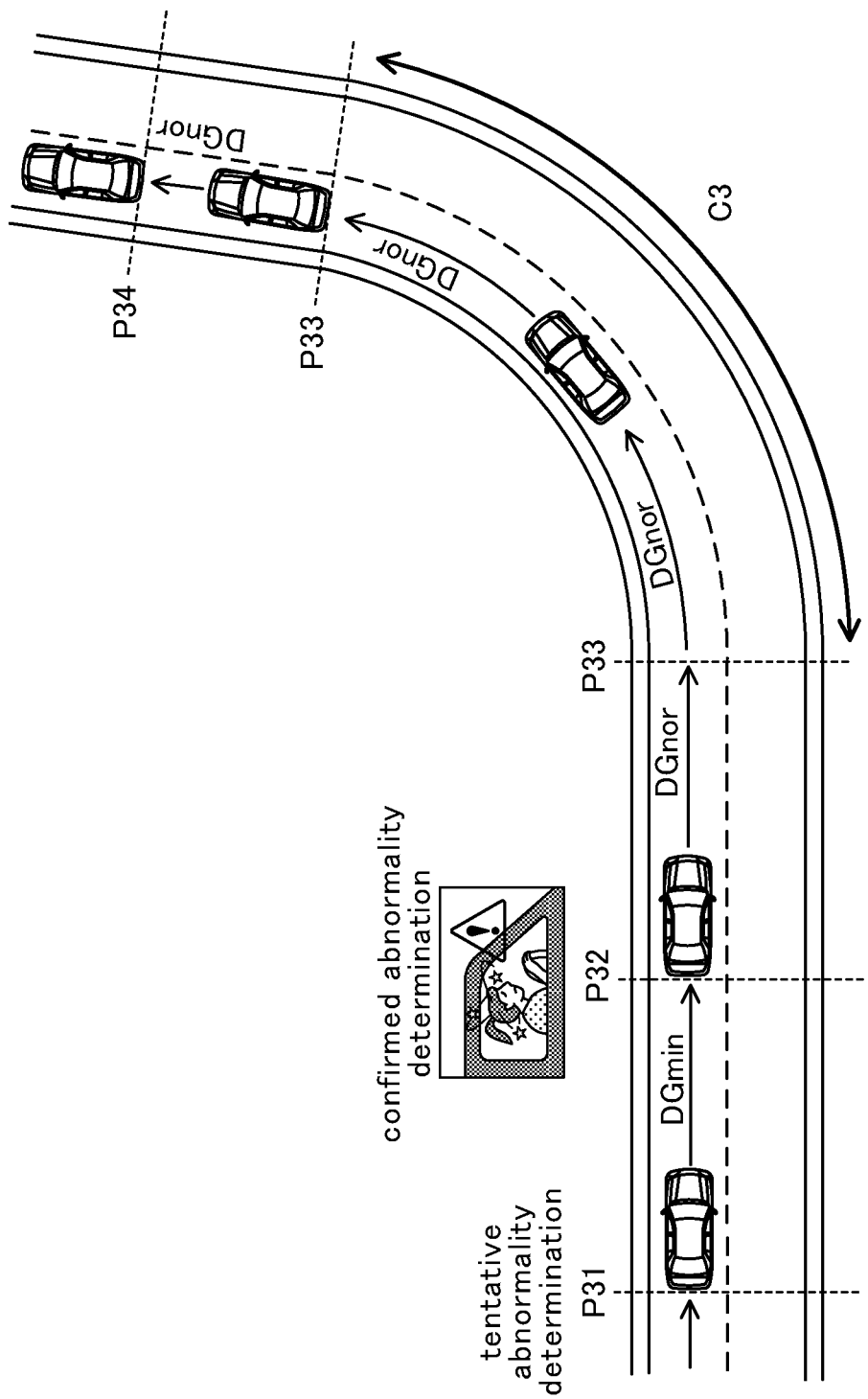
FIG. 3 is a drawing for describing an operation of the first apparatus.

For example, in the example shown in FIG. 3, the tentative abnormality determination is made when the vehicle reaches a point P31, and the vehicle is decelerated at the minimum deceleration DGmin after the vehicle passes the point P31. When the vehicle reaches a point P32, the confirmed abnormality determination is made. In this example, the first apparatus predicts (determines) that the control limit of the lane keeping control will not come after the vehicle enters the curved road C3. Therefore, the first apparatus decelerates the vehicle at the normal deceleration DGnor after it passes the point P32. In addition, in this example, when the vehicle reaches a point P34 after it passes through the curved road C3 while the lane keeping control is being executed, the vehicle completely stops.

In contrast, when the confirmed abnormality determination is made and when the first apparatus predicts (determines) that the control limit of the lane keeping control will come before a time point at which the vehicle completely stops in a case where the vehicle is decelerated at the normal deceleration DGnor, the first apparatus decelerates the vehicle at a "maximum deceleration DGmax" that is greater than the normal deceleration DGnor.

Figure 4:
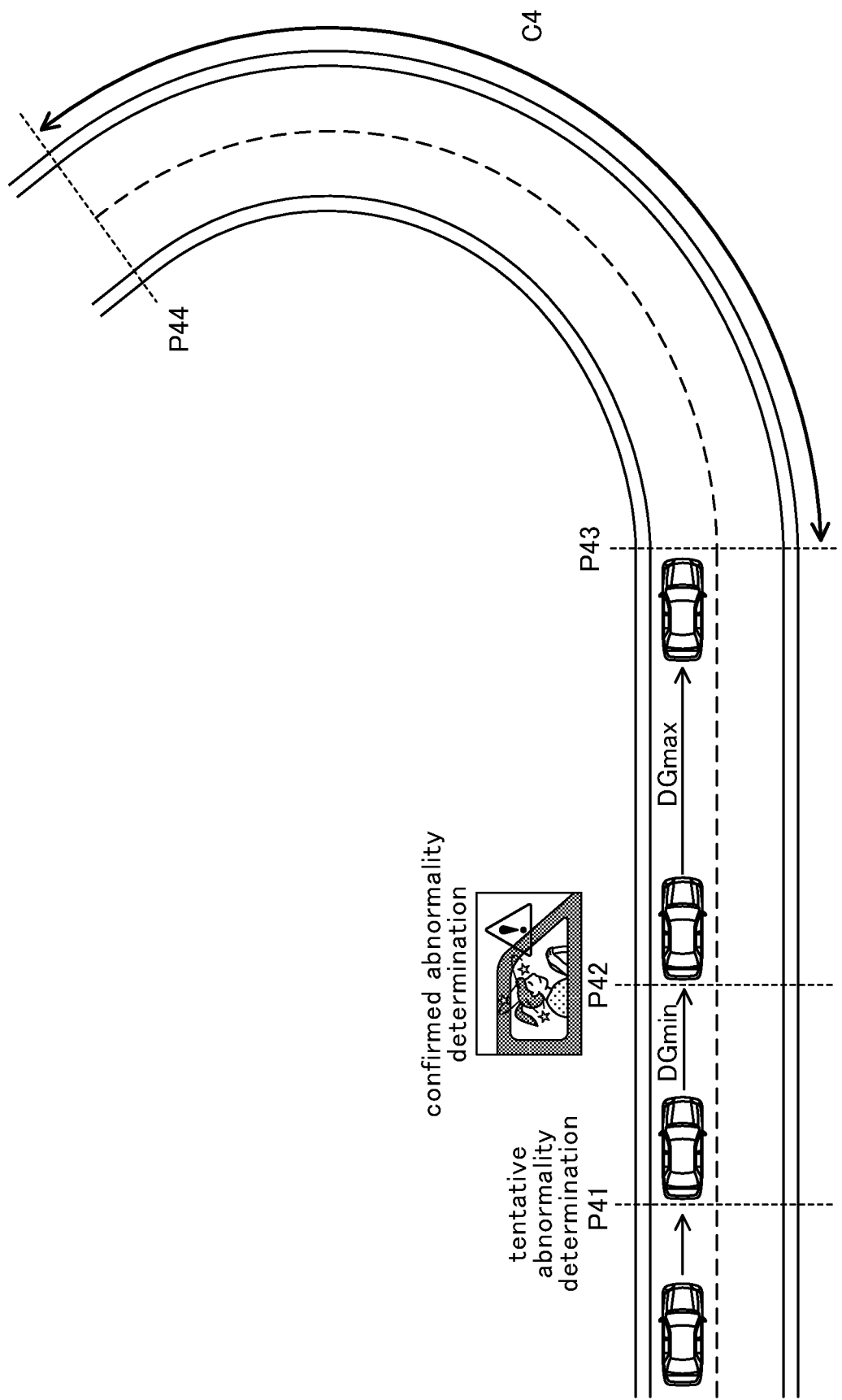
FIG. 4 is a drawing for describing an operation of the first apparatus.

For example, in the example shown in FIG. 4, the tentative abnormality determination is made when the vehicle reaches a point P41, and the vehicle is decelerated at the minimum deceleration DGmin after the vehicle passes the point P41. When the vehicle reaches a point P42, the confirmed abnormality determination is made. In this example, the first apparatus predicts (determines) that the control limit of the lane keeping control will come immediately after the vehicle enters the curved road C4. Therefore, the first apparatus decelerates the vehicle at the maximum deceleration DGmax after it passes the point P42. Consequently, in this example, the vehicle completely stops at a point P43 before the vehicle enters the curved road C4.

Figure 5:
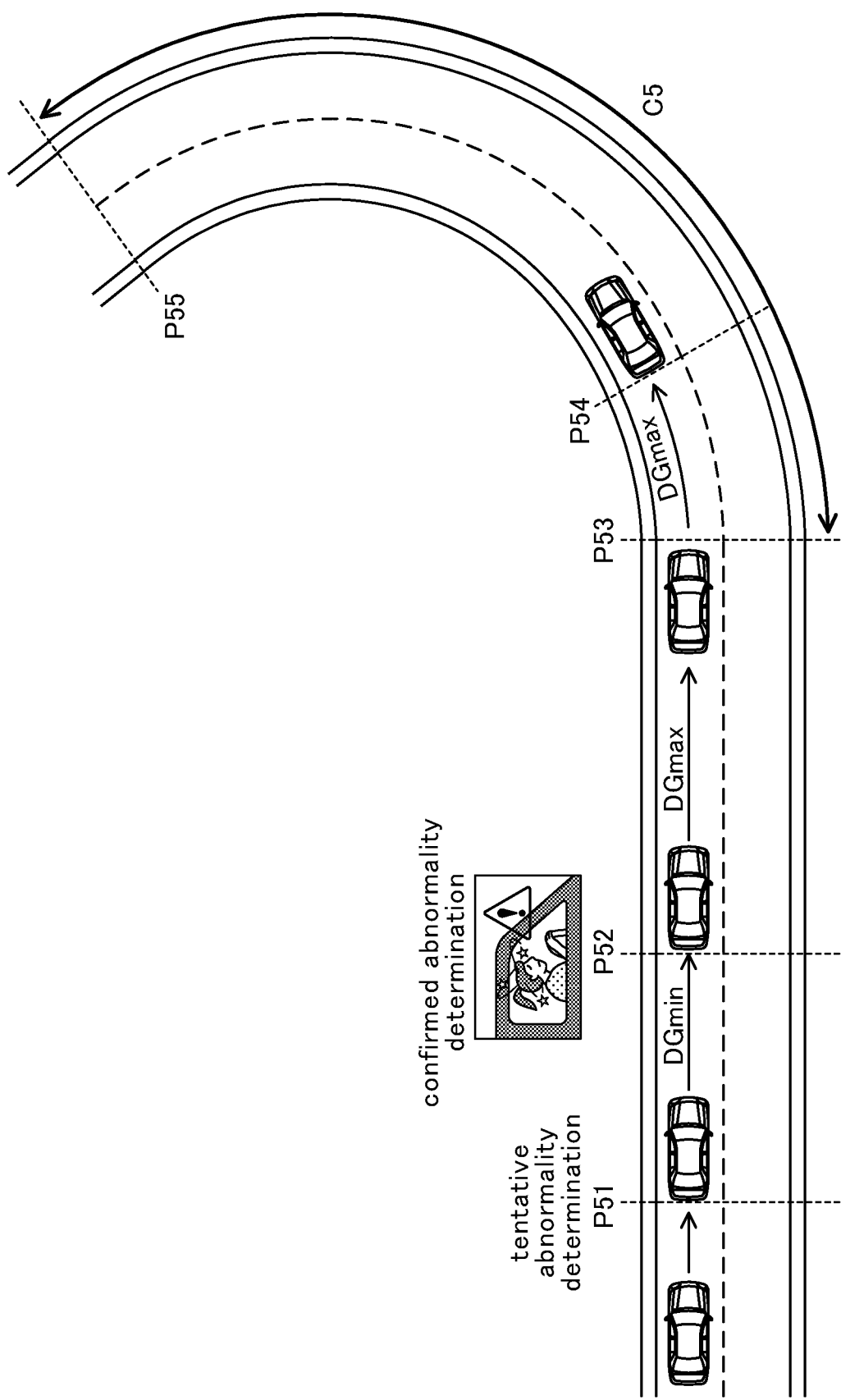
FIG. 5 is a drawing for describing an operation of the first apparatus.

For example, in the example shown in FIG. 5, the tentative abnormality determination is made when the vehicle reaches a point P51, and the vehicle is decelerated at the minimum deceleration DGmin after the vehicle passes the point P51. When the vehicle reaches a point P52, the confirmed abnormality determination is made. In this example, the first apparatus predicts (determines) that the control limit of the lane keeping control will come after the vehicle enters the curved road C5. Therefore, the first apparatus decelerates the vehicle at the maximum deceleration DGmax after it passes the point P52. In this example, the vehicle completely stops at a point P54 after the vehicle enters the curved road C5. In this case, the vehicle continues to be decelerated at the maximum deceleration DGmax, even when the control limit of the lane keeping control has come while the vehicle travels between the point P53 and P54 so that the lane keeping control is stopped (canceled) (Specific Operations)

Specific operations of the CPU of the ECU 10 of the first apparatus will next be described. The CPU is configured or programmed to execute each of routines shown by flowcharts in FIGS. 6 and 11, every time a predetermined time elapses.

Abnormality Determination of the Driver

Figure 6:
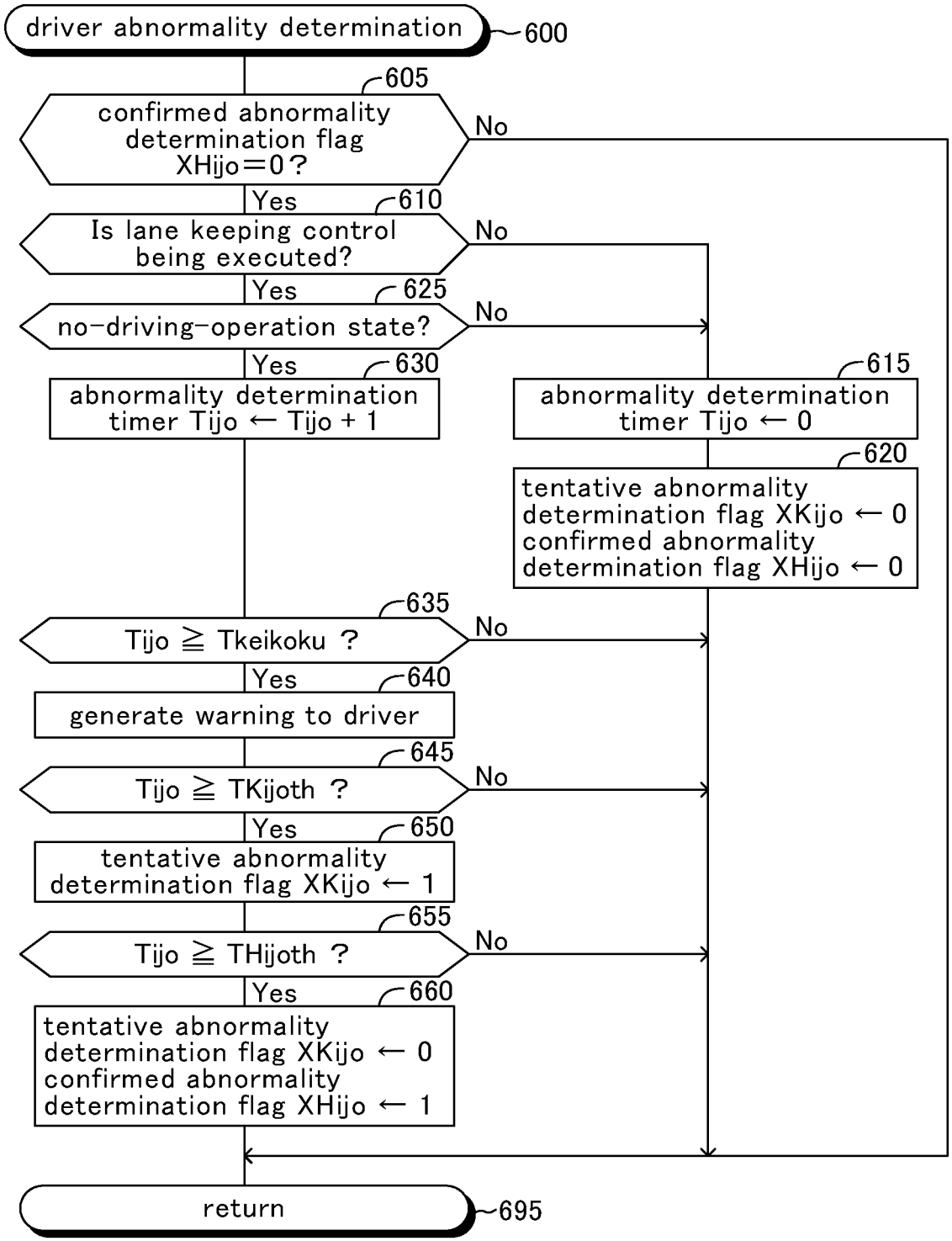
FIG. 6 is a flowchart illustrating a routine executed by a CPU of the first apparatus.

When an appropriate time point comes, the CPU starts processing from step 600 in FIG. 6, and proceeds to step 605. At step 605, the CPU determines whether or not a value of a confirmed abnormality determination flag XHijo is "0".

The value of the confirmed abnormality determination flag XHijo is set to "0" through an initialization routine that is executed by the CPU when a position of an unillustrated ignition key switch is changed from an off position to an on position. Furthermore, as described later, the value of the confirmed abnormality determination flag XHijo is set to "1", when it is confirmed that the driver of the vehicle (host vehicle) has fallen into the state (i.e., the abnormal state) in which he/she is unable to drive the vehicle.

When the value of the confirmed abnormality determination flag XHijo is not "0", the CPU makes a "No" determination at step 605, and directly proceeds to step 695 to terminate the present routine tentatively.

Whereas, when the value of the confirmed abnormality determination flag XHijo is "0", the CPU makes a "Yes" determination at step 605, and proceeds to step 610. At step 610, the CPU determines whether or not the lane keeping control is currently being executed.

When the lane keeping control is currently not being executed, the CPU makes a "No" determination at step 610, the CPU sequentially executes processes of step 615 and step 620, described below, and proceeds to step 695 to terminate the present routine tentatively.

Step 615: the CPU sets a value of an abnormality determination timer Tijo, described later, to "0".

Step 620: the CPU sets each of a value of a tentative abnormality determination flag XKijo and the value of the confirmed abnormality determination flag XHijo to "0".

The value of the tentative abnormality determination flag XKijo is set to "0" through the above-described initialization routine. Furthermore, as described later, the value of the tentative abnormality determination flag XKijo is set to "1", when it is determined that it is likely that the driver has fallen into the abnormal state (i.e., when the tentative abnormality determination is made).

Whereas, when the lane keeping control is currently being executed, the CPU makes a "Yes" determination at step 610, and the CPU proceeds to step 625. At step 625, the CPU determines whether or not a current driving state is a no-driving-operation state. The no-driving-operation state is a state where any parameters comprising a combination of one or more of "the acceleration pedal operation amount AP, the brake pedal operation amount BP, the steering torque Tra, and the low level signal generated by the touch sensor 13" has not changed between "a time point a predetermined time before the present time point" and "the present time point".

When the current driving state is not the no-driving-operation state, the CPU makes a "No" determination at step 625, and sequentially executes the above-described processes of "step 615 to step 620". Thereafter, the CPU proceeds to step 695 to terminate the present routine tentatively.

In contrast, when the current driving state is the no-driving-operation state, the CPU makes a "Yes" determination at step 625, and proceeds to step 630. At step 630, the CPU increments the value of the abnormality determination timer Tijo by "1". Thus, the value of the abnormality determination timer Tijo indicates a continuous time of the no-driving-operation state.

Subsequently, the CPU proceeds to step 635 so as to determine whether or not the value of the abnormality determination timer Tijo is equal to or greater than a warning start time threshold Tkeikoku. When the value of the abnormality determination timer Tijo is smaller than the warning start time threshold Tkeikoku, the CPU makes a "No" determination at step 635, and directly proceeds to step 695 to terminate the present routine tentatively.

Whereas, when the value of the abnormality determination timer Tijo is equal to or greater than the warning start time threshold Tkeikoku, the CPU makes a "Yes" determination at step 635, and proceeds to step 640. At step 640, the CPU transmits an instruction signal to the meter ECU 60 to cause the buzzer 63 to generate the warning sound, cause the meter display 64 to blink a warning lamp, and cause the meter display 64 to display a warning message to urge the driver to operate at least one of "the acceleration pedal 11a, the brake pedal 12a, and the steering wheel SW".

Subsequently, the CPU proceeds to step 645 so as to determine whether or not the value of the abnormality determination timer Tijo is equal to or greater than a tentative abnormality determination time threshold TKijoth. The tentative abnormality determination time threshold TKijoth has been set at a value larger than the warning start time threshold Tkeikoku. When the value of the abnormality determination timer Tijo is smaller than the tentative abnormality determination time threshold TKijoth, the CPU makes a "No" determination at step 645, and directly proceeds to step 695 to terminate the present routine tentatively.

Whereas, when the value of the abnormality determination timer Tijo is equal to or greater than the tentative abnormality determination time threshold TKijoth, the CPU makes a "Yes" determination at step 645, and proceeds to step 650. At step 650, the CPU sets the value of the tentative abnormality determination flag XKijo to "1". Namely, the CPU determines that it is likely that the driver has fallen into the state (i.e., the abnormal state) where he/she is unable to drive the (host) vehicle, when the continuous time of the no-driving-operation state becomes equal to or longer than a time corresponding to the tentative abnormality determination time threshold TKijoth.

Subsequently, the CPU proceeds to step 655 so as to determine whether or not the value of the abnormality determination timer Tijo is equal to or greater than a confirmed abnormality determination time threshold THijoth. The confirmed abnormality determination time threshold THijoth has been set at a value larger than the tentative abnormality determination time threshold TKijoth. When the value of the abnormality determination timer Tijo is smaller than the confirmed abnormality determination time threshold THijoth, the CPU makes a "No" determination at step 655, and directly proceeds to step 695 to terminate the present routine tentatively.

Whereas, when the value of the abnormality determination timer Tijo is equal to or greater than the confirmed abnormality determination time threshold THijoth, the CPU makes a "Yes" determination at step 655, and proceeds to step 660. At step 660, the CPU sets the value of the tentative abnormality determination flag XKijo to "0", and sets the value of the confirmed abnormality determination flag XHijo to "1". Thereafter, the CPU proceeds to step 695 to terminate the present routine tentatively. Namely, the CPU finalizes (confirms) the determination that the driver has fallen into the state (i.e., the abnormal state) where he/she is unable to drive the (host) vehicle, when the continuous time of the no-driving-operation state becomes equal to or longer than a time corresponding to the confirmed abnormality determination time threshold THijoth.

In this manner, when the no-driving-operation state continues for the time corresponding to the warning start time threshold Tkeikoku or longer, the warning that urges the driver to perform the driving operation is generated. Thereafter, when the no-driving-operation state continues for the time corresponding to the tentative abnormality determination time threshold TKijoth or longer, it is determined that the driver is likely to have fallen into the abnormal state, and the value of the tentative abnormality determination flag XKijo is set to "1". Namely, the tentative abnormality determination is made. Furthermore, when the no-driving-operation state continues for the time corresponding to the confirmed abnormality determination time threshold THijoth or longer, it is finalized/confirmed that the determination that the driver has fallen into the abnormal state, and the value of the confirmed abnormality determination flag XHijo is set to "1". Namely, the confirmed abnormality determination is made.

Target Deceleration Setting Process while the Tentative Abnormality Determination Is Made.

Figure 7:
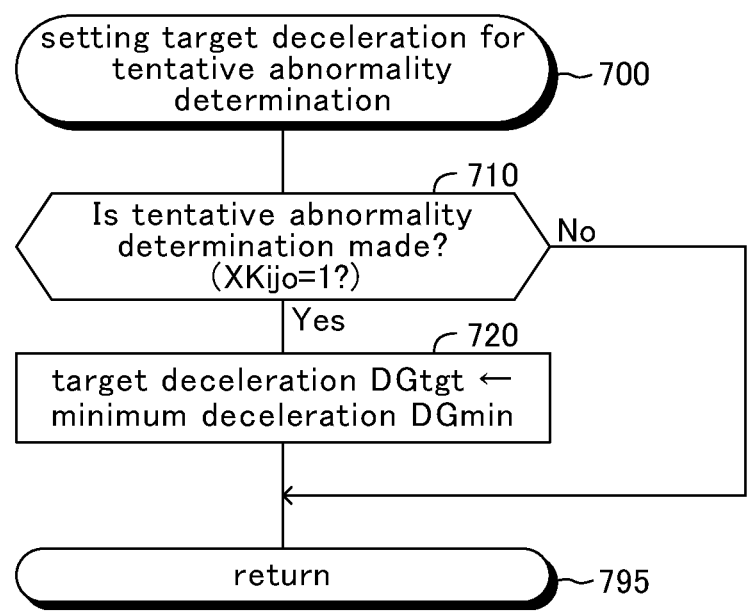
FIG. 7 is a flowchart illustrating a routine executed by the CPU of the first apparatus.

When an appropriate time point comes, the CPU starts processing from step 700 in FIG. 7, and proceeds to step 710. At step 710, the CPU determines whether or not the current state is a state where the tentative abnormality determination is made (namely, whether or not the value of the tentative abnormality determination flag XKijo is "1"). When the current state is not the state where the tentative abnormality determination is made (namely, when the tentative abnormality determination flag XKijo is "0"), the CPU makes a "No" determination at step 710, and directly proceeds to step 795 to terminate the present routine tentatively.

Whereas, when the current state is the state where the tentative abnormality determination is made (namely, when the tentative abnormality determination flag XKijo is "1"), the CPU makes a "Yes" determination at step 710, and proceeds to step 720. At step 720, the CPU sets a value of the target deceleration to the constant minimum deceleration DGmin. It should be noted that, in the present specification, a deceleration is represented by a positive value, and indicates a decrease magnitude in the vehicle speed per unit time. Thus, as the deceleration is greater, the vehicle speed decreases more rapidly. Thereafter, the CPU proceeds to step 795 to terminate the present routine tentatively.

In this manner, when the current state is the state where the tentative abnormality determination is made, the value of the target deceleration is set to the minimum deceleration DGmin. It should be noted that the minimum deceleration DGmin may sometimes be referred to as "a third deceleration" for convenience sake.

Target Deceleration Setting Process while the Confirmed Abnormality Determination Is Made.

Figure 8:
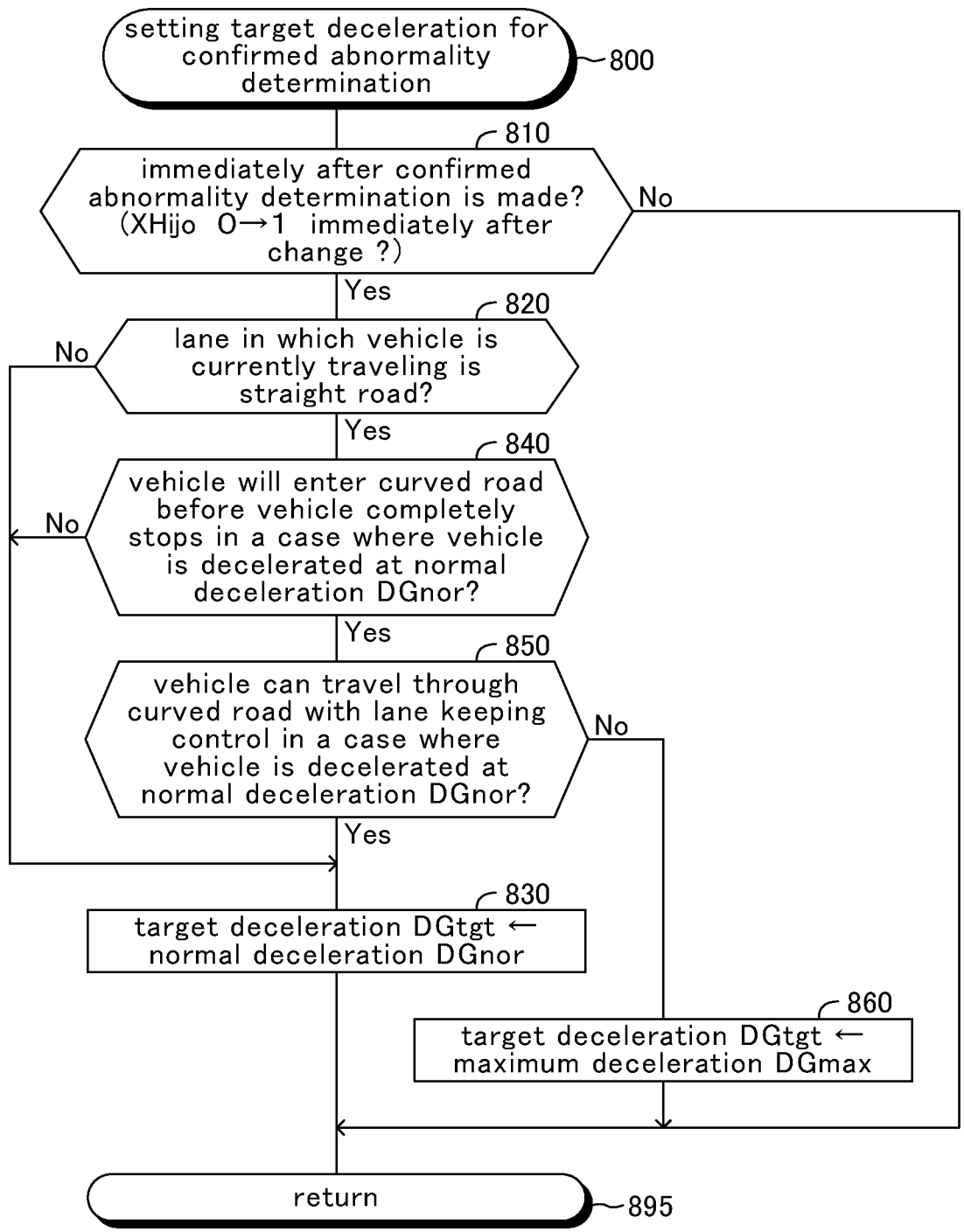
FIG. 8 is a flowchart illustrating a routine executed by the CPU of the first apparatus.

When an appropriate time point comes, the CPU starts processing from step 800 in FIG. 8, and proceeds to step 810. At step 810, the CPU determines whether or not the present time point is immediately after the confirmed abnormality determination is made. In other words, the CPU determines whether or not the present time point is immediately after the value of the confirmed abnormality determination flag XHijo is changed from "0" to "1".

When the present time point is not immediately after the confirmed abnormality determination is made, the CPU makes a "No" determination at step 810, and directly proceeds to step 895 to terminate the present routine tentatively.

Whereas, when the present time point is immediately after the confirmed abnormality determination is made, the CPU makes a "Yes" determination at step 810, and proceeds to step 820. At step 820, the CPU determines whether or not a lane (i.e., traveling lane) in which the vehicle is currently traveling is a straight road, based on the curvature radius R obtained by the camera device 17b. More specifically, the CPU determines that the traveling lane is the straight road when the curvature radius R is greater than a curved road determination threshold Rcth.

When the traveling lane is not the straight road (namely, is the curved road), it can be predicted (or considered) that the control limit of the lane keeping control will not come, and thus, the lane keeping control will not be stopped (canceled), since the lane keeping control is currently being executed without being canceled. Therefore, in this case, the CPU makes a "No" determination at step 820, and proceeds to step 830. At step 830, the CPU sets the value of the target deceleration DGtgt to "the constant normal deceleration DGnor that is equal to or greater than the minimum deceleration DGmin (i.e., set to the normal deceleration DGnor having an absolute value equal to or larger than the absolute value of the minimum deceleration DGmin)". Thereafter, the CPU proceeds to step 895 to terminate the present routine tentatively. It should be noted that the normal deceleration DGnor may sometimes be referred to as "a first deceleration" for convenience sake. The absolute value of the normal deceleration DGnor may be equal to the absolute value of the minimum deceleration DGmin, however, be preferably greater than the absolute value of the minimum deceleration DGmin.

On the other hand, if the traveling lane is the straight road when the CPU proceeds to step 820, the CPU makes a "Yes" determination at step 820, and proceeds to step 840. At step

840, the CPU determines whether or not the vehicle will enter the curved road before the vehicle completely stops in a case where the vehicle is decelerated at the normal deceleration DGnor from the current vehicle speed. More specifically, the CPU determines, based on the present vehicle speed, the normal deceleration DGnor, and information (lane information) obtained from the map data base 22 through the navigation ECU 20, whether or not a part of the traveling lane along which the vehicle will travel before the vehicle completely stops includes a part whose curvature radius R is equal to or smaller than the curved road determination threshold Rcth.

When the vehicle will not enter the curved road before the vehicle completely stops in the case where the vehicle is decelerated at the normal deceleration DGnor, the CPU makes a "No" determination at step 840, and executes the process of step 830. Thereafter, the CPU proceeds to step 895 to terminate the present routine tentatively. Thus, in this case, the value of the target deceleration DGtgt is set to the normal deceleration DGnor.

Whereas, when the vehicle will enter the curved road before the vehicle completely stops in the case where the vehicle is decelerated at the normal deceleration DGnor, the CPU makes a "Yes" determination at step 840, and proceeds to step 850. At step 850, the CPU determines whether there will be no chance/case in which a control limit condition of the lane keeping control becomes satisfied in the curved road which the vehicle is predicted to enter in the case where the vehicle is decelerated at the normal deceleration DGnor from the current vehicle speed. Namely, the CPU determines whether or not the vehicle can travel through the curved road or can travel until it stops in the curved road in a state where the lane keeping control is not canceled (stopped). The control limit condition of the lane keeping control is satisfied, for example, at least when the lateral acceleration of the vehicle is equal to or greater than a control limit lateral acceleration Gyth.

More specifically, at step 850, the CPU predicts through calculation a "curved road entering vehicle speed" that is a vehicle speed at an entering (entrance/start) point of the curved road which the vehicle is predicted to enter in the case where the vehicle is decelerated at the normal deceleration DGnor from the current vehicle speed. Then, the CPU predicts the lateral acceleration of the vehicle, based on the curved road entering vehicle speed and the curvature radius. Furthermore, the CPU determines whether or not the predicted lateral acceleration is smaller than the control limit lateral acceleration.

When there will be no chance/case in which the control limit condition of the lane keeping control becomes satisfied in the curved road which the vehicle is predicted to enter (namely, when the predicted lateral acceleration is smaller than the control limit lateral acceleration), the CPU makes a "Yes" determination at step 850, and proceeds to step 830. At step 830, the CPU sets the value of the target deceleration DGtgt to the normal deceleration DGnor. Thereafter, the CPU proceeds to step 895 to terminate the present routine tentatively.

In contrast, when there will be a chance/case in which the control limit condition of the lane keeping control becomes satisfied in the curved road which the vehicle is predicted to enter (namely, when the predicted lateral acceleration is equal to or greater than the control limit lateral acceleration, and thus, the vehicle cannot travel through the curved road while the lane keeping control is being executed), the CPU makes a "No" determination at step 850, and proceeds to step 860. At step 860, the CPU sets the value of the target deceleration DGtgt to "the constant maximum deceleration DGmax greater than the normal deceleration DGnor (i.e., the maximum deceleration DGmax having the absolute value larger than the absolute value of the normal deceleration DGnor)". Thereafter, the CPU proceeds to step 895 to terminate the present routine tentatively. It should be noted that the maximum deceleration DGmax is a maximum (greatest) value of the deceleration of the vehicle that the system (lane keeping control) permits, and may sometimes be referred to as "a second deceleration" for convenience sake.

Deceleration Control when the Abnormality Determination is Made.

Figure 9:
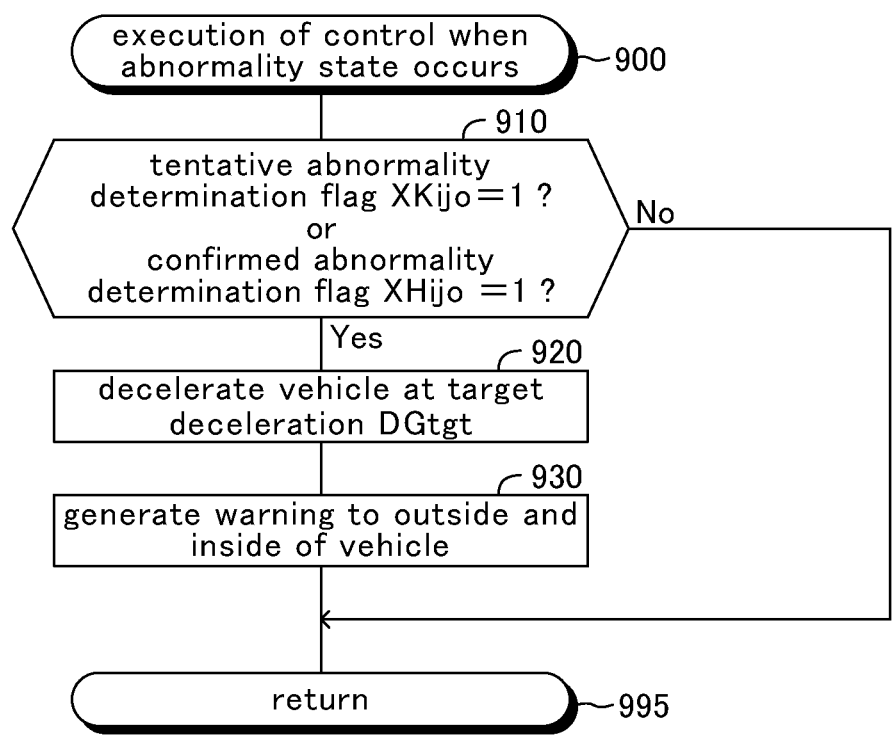
FIG. 9 is a flowchart illustrating a routine executed by the CPU of the first apparatus.

When an appropriate time point comes, the CPU starts processing from step 900 in FIG. 9, and proceeds to step 910. At step 910, the CPU determines whether or not either one of the value of the tentative abnormality determination flag XKijo and the value of the confirmed abnormality determination flag XHijo is "1". When both of the value of the tentative abnormality determination flag XKijo and the value of the confirmed abnormality determination flag XHijo are "0", the CPU makes a "No" determination at step 910, and directly proceeds to step 995 to terminate the present routine tentatively.

Whereas, when either one of the value of the tentative abnormality determination flag XKijo and the value of the confirmed abnormality determination flag XHijo is "1", the CPU makes a "Yes" determination at step 910, and proceeds to step 920.

At step 920, the CPU decelerates the vehicle in such a manner that an actual deceleration of the vehicle (i.e., an absolute value of a decreased amount in the vehicle speed SPD per unit time) becomes equal to (coincides with) the target deceleration DGtgt. Subsequently, the CPU proceeds to step 930 so as to generate a warning to the outside and the inside of the vehicle. More specifically, the CPU transmits an instruction to the meter ECU 60 so as to blink the hazard lamp 61 and the stop lamp 62, generate a warning sound to the inside of the vehicle, and display a warning on the meter display 64. In addition, the CPU transmits an instruction to the body ECU 70 to generate a warning sound to the outside of the vehicle from the horn 71. Thereafter, the CPU proceeds to step 995 to terminate the present routine tentatively.

Determination for Allowing a Start of the Lane Keeping Control.

Figure 10:
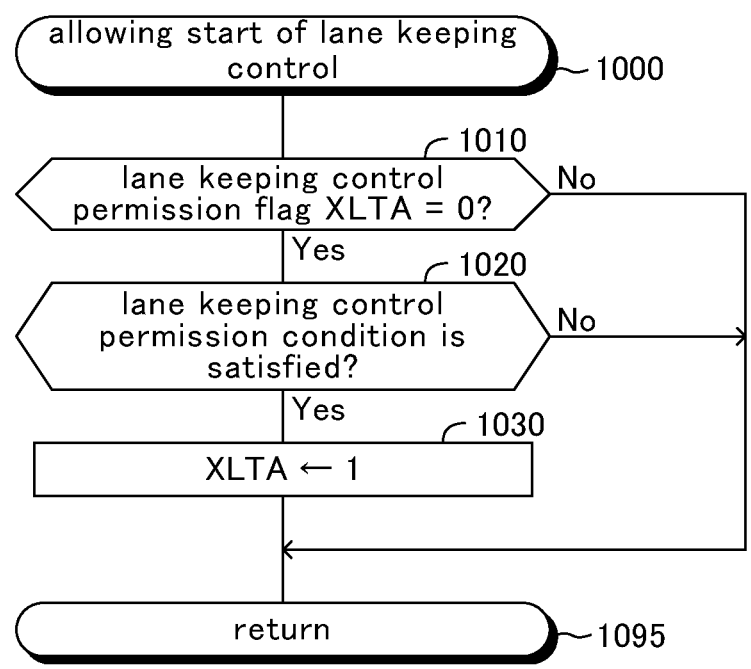
FIG. 10 is a flowchart illustrating a routine executed by the CPU of the first apparatus.

When an appropriate time point comes, the CPU starts processing from step 1000 in FIG. 10, and proceeds to step 1010. At step 1010, the CPU determines whether or not a value of a lane keeping control permission flag XLTA is "0". The value of the lane keeping control permission flag XLTA is set to "0" through the above-described initialization routine. When the value of the lane keeping control permission flag XLTA is not "0" (i.e., is "1"), the CPU makes a "No" determination at step 1010, and directly proceeds to step 1095 to terminate the present routine tentatively.

Whereas, when the value of the lane keeping control permission flag XLTA is "0", the CPU makes a "Yes" determination at step 1010, and proceeds to step 1020. At step 1020, the CPU determines whether or not a lane keeping control permission condition is satisfied.

The lane keeping control permission condition is satisfied, when all of the following condition is satisfied.

(condition A1) the present time point is immediately after the lane keeping control is selected based on an operation to the operation switch 18.

(condition A2) the inter-vehicle-distance maintaining control is being executed.

(condition A3) the magnitude of the actual lateral acceleration Gy is smaller than the control limit lateral acceleration Gyth.

(condition A4) the left and right lane markers (white lines) of the road is recognized by the camera device 17b.

When the lane keeping control permission condition is not satisfied, the CPU makes a "No" determination at step 1020, and directly proceeds to step 1095 to terminate the present routine tentatively.

Whereas, when the lane keeping control permission condition is satisfied, the CPU makes a "Yes" determination at step 1020, and proceeds to step 1030. At step 1030, the CPU sets the value of the lane keeping control permission flag XLTA to "1", and proceeds to step 1095 to terminate the present routine tentatively.

Execution of the Lane Keeping Control and Determination for Termination of the Lane Keeping Control.

Figure 11:
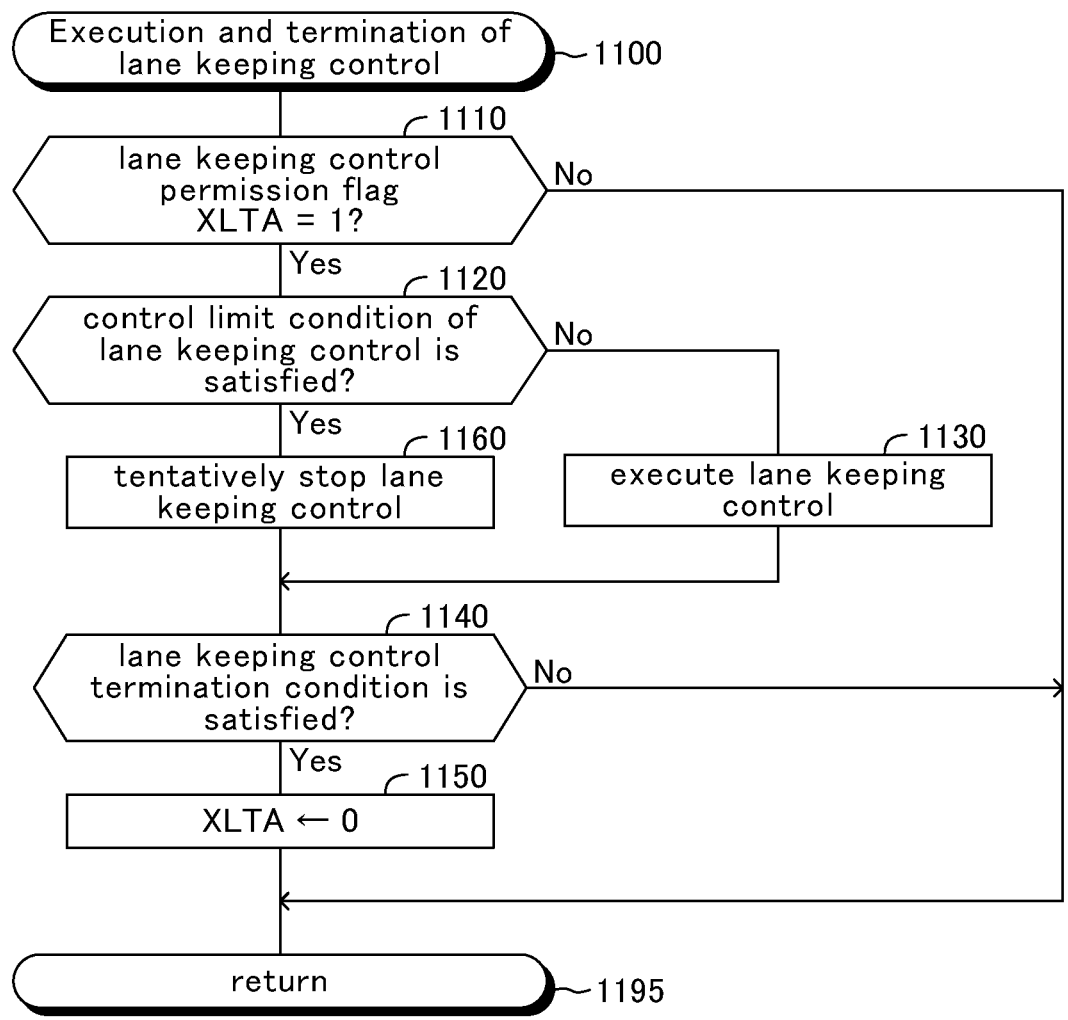
FIG. 11 is a flowchart illustrating a routine executed by the CPU of the first apparatus.

When an appropriate time point comes, the CPU starts processing from step 1100 in FIG. 11, and proceeds to step 1110. At step 1110, the CPU determines whether or not the value of the lane keeping control permission flag XLTA is "1". When the value of the lane keeping control permission flag XLTA is not "1", the CPU makes a "No" determination at step 1110, and directly proceeds to step 1195 to terminate the present routine tentatively. In this case, the lane keeping control is not executed.

Whereas, when the value of the lane keeping control permission flag XLTA is "1", the CPU makes a "Yes" determination at step 1110, and proceeds to step 1120. At step 1120, the CPU determines whether or not the control limit condition of the lane keeping control is actually satisfied. In this case, the CPU determines whether or not the actual lateral acceleration Gy is equal to or greater than the control limit lateral acceleration Gyth.

When the control limit condition of the lane keeping control is not satisfied, the CPU makes a "No" determination at step 1120, and proceeds to step 1130 so as to execute the lane keeping control. The lane keeping control is a well-known control to assist the steering operation of the driver by applying a steering torque to the steering mechanism in such a manner that a position of the vehicle in the lane width direction is maintained in the vicinity of a target traveling lane in the traveling lane in which the vehicle is traveling (refer to Japanese Patent Application Laid-Open No. 2008-195402, Japanese Patent Application Laid-Open No. 2009-190464, Japanese Patent Application Laid-Open No. 2010-6279, and Japanese issued U.S. Pat. No. 4,349,210). The lane keeping control is briefly described below.

The CPU recognizes (obtains) the left white line LL and the right white line LR that define the traveling lane, based on the image data transmitted from the camera device 17b, and determines a central position of the pair of the white lines LL, LR, as the target travel line Ld. Furthermore, the CPU obtains through calculation a curvature radius (curve radius) R of the target travel line Ld, and the position and the direction of the vehicle in (with respect to) the travel lane.

The CPU obtains through calculation a distance Dc (hereinafter, referred to as a "center distance Dc") between a center of a front end of the vehicle and the target travel line Ld, and a deviation angle θy (hereinafter, referred to as a "yaw angle θy") formed between a direction of the target travel line Ld and a moving direction of the vehicle.

The CPU obtains through calculation a target yaw rate YRtgt by applying the center distance Dc, the yaw angle θy, and a curvature n (=1/curvature radius R) to an equation (1) described below. In the equation (1), K1, K2, and K3 are control gains. The target yaw rate YRtgt is a yaw rate for letting the vehicle travel along the target travel line Ld.

$$YRtgt = K1 \cdot c + K2 \cdot \theta y + K3 \cdot n$$

The CPU obtains through calculation a target steering torque Trtgt for realizing the target yaw rate YRtgt based on the target yaw rate YRtgt and an actual yaw rate YRa. More specifically, the ECU 10 has stored in advance a relationship among the target yaw rate YRtgt, the actual yaw rate YRa, the vehicle speed SPD, and the target steering torque Trtgt in the form of a look-up table. The CPU obtains through calculation the target steering torque Trtgt by applying "the target yaw rate YRtgt, the actual yaw rate YRa, the vehicle speed SPD" obtained as described above to the look-up table. Thereafter, the ECU 10 controls the steering motor 52 in such a manner that an actual steering torque Tra becomes equal to the target steering torque Trtgt. This is an outline of the lane keeping control.

Subsequently, the CPU proceeds to step 1140 so as to determine whether or not a lane keeping control termination/end condition is satisfied. The lane keeping control termination condition is satisfied, for example, when terminating the lane keeping control is selected based on an operation to the operation switch 18.

When the lane keeping control termination condition is not satisfied, the CPU makes a "No" determination at step 1140, and directly proceeds to step 1195 to terminate the present routine tentatively. Whereas, when the lane keeping control termination condition is satisfied, the CPU makes a "Yes" determination at step 1140, and proceeds to step 1150. At step 1150, the CPU sets the value of the lane keeping control permission flag XLTA to "0". Thereafter, the CPU proceeds to step 1195 to terminate the present routine tentatively.

Whereas, if the control limit condition of the lane keeping control is satisfied when the CPU proceeds to step 1120, the CPU makes a "Yes" determination at step 1120, and proceeds to step 1160. At step 1160, the CPU tentatively/temporarily stops (or, terminates or cancels) the lane keeping control. Thereafter, the CPU proceeds to step 1140.

As has been described, the first apparatus mildly/generously decelerates the vehicle at the minimum deceleration DGmin when the tentative abnormality determination is made. When the confirmed abnormality determination is made under this state, the first apparatus decelerates the vehicle at the normal deceleration DGnor greater than the minimum deceleration DGmin. However, when it is predicted that the control limit of the lane keeping control will come before the time point at which the vehicle completely stops in the case where the vehicle is decelerated at the normal deceleration DGnor from when the confirmed abnormality determination is made, the first apparatus decelerates the vehicle at the maximum deceleration DGmax greater than the normal deceleration DGnor. The deceleration control using one of the minimum deceleration DGmin, the normal deceleration DGnor, and the maximum deceleration DGmax is executed regardless of whether or not the lane keeping control is stopped (canceled) because of the control limit of the lane keeping control.

This can avoid a "situation where the lane keeping control is canceled when the control limit of the lane keeping control comes after the vehicle enters the curved road from the straight road in the case where the confirmed abnormality determination is made, and thus, the deceleration control for the vehicle owing to the confirmed abnormality determination is also stopped when the lane keeping control is canceled". In addition, when it is predicted that the control limit of the lane keeping control will come, the vehicle is decelerated at the maximum deceleration DGmax. This can increase a possibility that the vehicle is stopped before the vehicle enter the curved road. Furthermore, even when the control limit of the lane keeping control comes after the vehicle enters the curved road, the vehicle speed can be sufficiently lowered by that time point.

Modification of the First Embodiment

The CPU of the driving assistance ECU 10 according to this modification determines that the control limit condition of the lane keeping control becomes satisfied in the curved road which the vehicle is predicted to enter, when at least one of the following conditions C1 and D1 is satisfied, at step 850 shown in FIG. 8.

(condition C1) the lateral acceleration that is predicted in the curved road that the vehicle is predicted to enter becomes equal to or greater than the control limit lateral acceleration Gyth.

(condition D1) the curvature radius of the curved road that the vehicle is predicted to enter is equal to or smaller than a control limit radius threshold Rltth. The control limit radius threshold Rltth has been set at a value that indicates that the curved road is so sharp that a white line in the vicinity of the vehicle is not included in the image data obtained by the camera of the camera device 17b (namely, the white line in the vicinity of the vehicle is outside of the shooting range of the camera).

In addition, the CPU of the driving assistance ECU 10 according to this modification determines that the control limit condition of the lane keeping control is actually satisfied, when at least one of the following conditions C2 and D3 is satisfied, at step 1120 shown in FIG. 11.

(condition C2) the actual lateral acceleration is equal to or greater than the control limit lateral acceleration Gyth.

(condition D2) the camera device 17b cannot recognize at least one of the left white line LL and the right white line, both being in the vicinity of the vehicle.

Second Embodiment

A vehicle control apparatus (hereinafter, referred to as a second apparatus) according to the second embodiment of the present disclosure is designed under the assumption that a curvature in one curved road varies between a start point of the curved road and an end point of the curved road. The second apparatus is different from the first apparatus only in that the CPU of the driving assistance ECU 10 of the second apparatus executes a routine shown by a flowchart in FIG. 12 in place of the routine shown in FIG. 8. Hereinafter, this difference will be mainly described.

Figure 12:
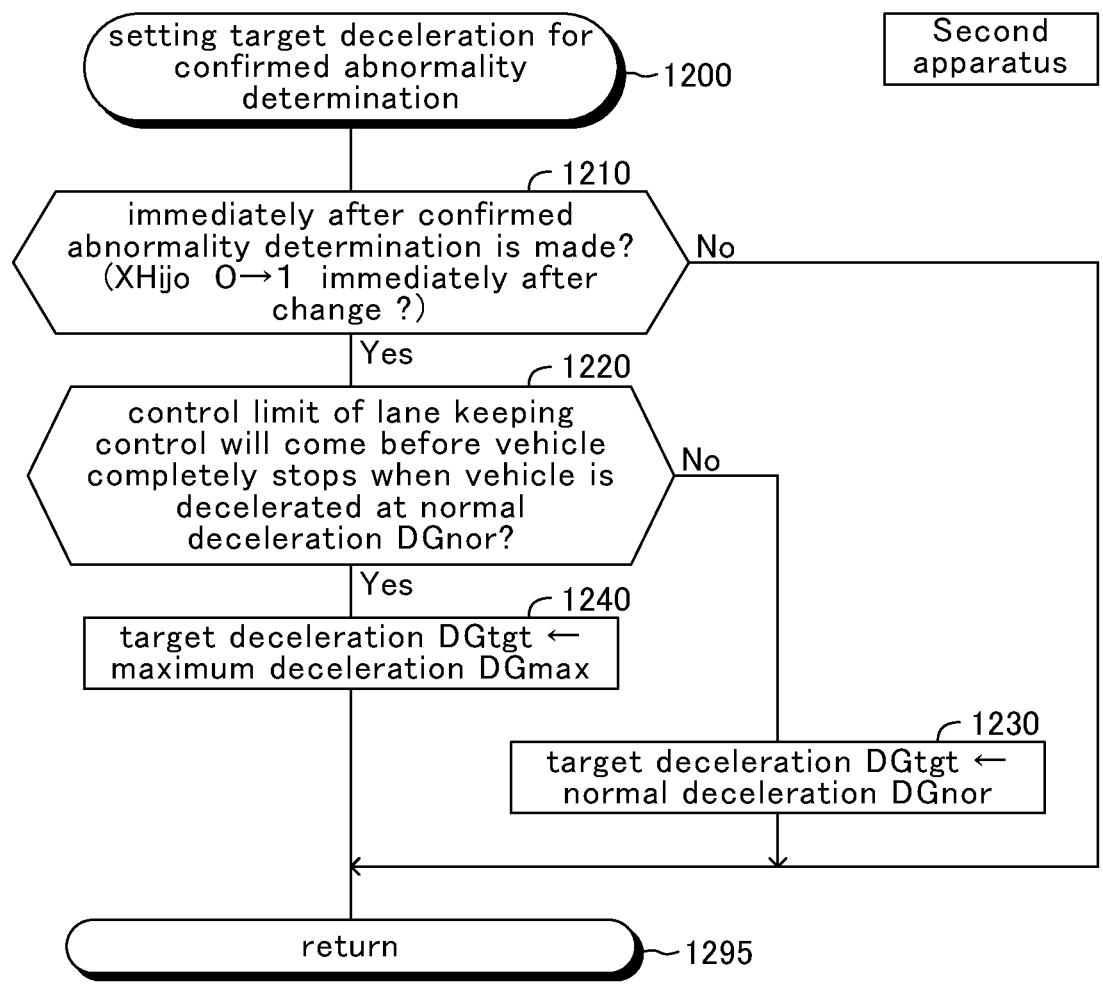
FIG. 12 is a flowchart illustrating a routine executed by a CPU of a vehicle control apparatus (second apparatus) according to a second embodiment of the present disclosure.

When an appropriate time point comes, the CPU starts processing from step 1200 in FIG. 12, and proceeds to step 1210. At step 1210, the CPU determines whether or not the present time point is immediately after the confirmed abnormality determination is made. In other words, the CPU determines whether or not the present time point is immediately after the value of the confirmed abnormality determination flag XHijo is changed from "0" to "1".

When the present time point is not immediately after the confirmed abnormality determination is made, the CPU makes a "No" determination at step 1210, and directly proceeds to step 1295 to terminate the present routine tentatively.

Whereas, when the present time point is immediately after the confirmed abnormality determination is made, the CPU makes a "Yes" determination at step 1210, and proceeds to step 1220. At step 1220, the CPU determines whether or not the control limit condition of the lane keeping control becomes satisfied before the vehicle completely stops in the case where the vehicle is decelerated at the normal deceleration DGnor from the current vehicle speed. Namely, the CPU determines whether or not there is a possibility that the lane keeping control is canceled (stopped) before the vehicle stops. The control limit condition of the lane keeping control is satisfied, for example, at least when the lateral acceleration of the vehicle is equal to or greater than the control limit lateral acceleration Gyth.

More specifically, the CPU obtains through calculation "a vehicle speed SPD(t) and a position P(t) of the vehicle" a time t later from the present time point based on the vehicle speed (current vehicle speed) SPDnow at the present time point and the position Pnow of the vehicle at the present time point, under the assumption that the vehicle starts decelerating at the normal deceleration DGnor from the current vehicle speed. Subsequently, the CPU read out the curvature radius R(t) at the position P(t) from the map data base 22 through the navigation ECU 20. The CPU predicts (obtains) the lateral acceleration Gy(t) of the vehicle the time t later from the present time based on the vehicle speed SPD(t) and the curvature radius R(t), and determines whether or not the predicted lateral acceleration Gy(t) is equal to or greater than the control limit lateral acceleration Gyth. The CPU repeats the above described determination processes with increasing a minute time Δt from "0" until the time t becomes equal to a time required for the vehicle to stop when the vehicle is decelerated at the normal deceleration DGnor.

When the predicted lateral acceleration Gy(t) does not become equal to or greater than the control limit lateral acceleration Gyth until the time point at which the vehicle stops in the case the vehicle is decelerated at the normal deceleration DGnor (namely, when it is predicted that the control limit of the lane keeping control will not come), the CPU makes a "No" determination at step 1220, and proceeds to step 1230. At step 1230, the CPU sets the value of the target deceleration DGtgt to the normal deceleration DGnor. Thereafter, the CPU proceeds to step 1295 to terminate the present routine tentatively.

Whereas, when the predicted lateral acceleration Gy(t) becomes equal to or greater than the control limit lateral acceleration Gyth before the time point at which the vehicle stops in the case the vehicle is decelerated at the normal deceleration DGnor (namely, when it is predicted that the control limit of the lane keeping control will come), the CPU makes a "Yes" determination at step 1220, and proceeds to step 1240. At step 1240, the CPU sets the value of the target deceleration DGtgt to the maximum deceleration DGmax. Thereafter, the CPU proceeds to step 1295 to terminate the present routine tentatively.

As has been described, the second apparatus mildly/generously decelerates the vehicle at the minimum deceleration DGmin when the tentative abnormality determination is made. When the confirmed abnormality determination is made under this state, the second apparatus decelerates the vehicle at the normal deceleration DGnor. However, when it is predicted that the control limit of the lane keeping control will come before the time point at which the vehicle completely stops in the case where the vehicle is decelerated at the normal deceleration DGnor from when the confirmed abnormality determination is made, the second apparatus decelerates the vehicle at the maximum deceleration DGmax. The deceleration control using one of the minimum deceleration DGmin, the normal deceleration DGnor, and the maximum deceleration DGmax is executed regardless of whether or not the lane keeping control is stopped (canceled) because of the control limit of the lane keeping control. In addition, even when the curvature varies in one curved road from the start point of the curved road to the end point of the curved road (for example, a section immediately after the start point of the curved road and a section immediately before the end point of the curved road are clothoid curves), the second apparatus can accurately predict whether or not the control limit of the lane keeping control will come before the time point at which the vehicle completely stops in the case where the vehicle is decelerated at the normal deceleration DGnor from when the confirmed abnormality determination is made.

Modification of the Second Embodiment

The CPU of the driving assistance ECU 10 according to this modification determines that the control limit condition of the lane keeping control becomes satisfied before the vehicle completely stops, when at least one of the following conditions C3 and D3 is satisfied, at step 1220 shown in FIG. 12.

(condition C3) the lateral acceleration that is predicted becomes equal to or greater than the control limit lateral acceleration Gyth before the vehicle completely stops in the case the vehicle is decelerated at the constant normal deceleration DGnor.

(condition D3) the curvature radius that is equal to or smaller than the control limit radius threshold Rltth will come before the vehicle completely stops in the case the vehicle is decelerated at the constant normal deceleration DGnor.

It should be noted that the CPU of the driving assistance ECU 10 according to this modification is configured to determine that the control limit condition of the lane keeping control is actually satisfied when at least one of "the conditions C2 and D2" described above becomes satisfied, at step 1120 shown in FIG. 11.

Third Embodiment

A vehicle control apparatus (hereinafter, referred to as a third apparatus) according to the third embodiment of the present disclosure is different from the second apparatus only in that it operates as follows when the traveling lane includes a steep ascending slope.

Figure 13:
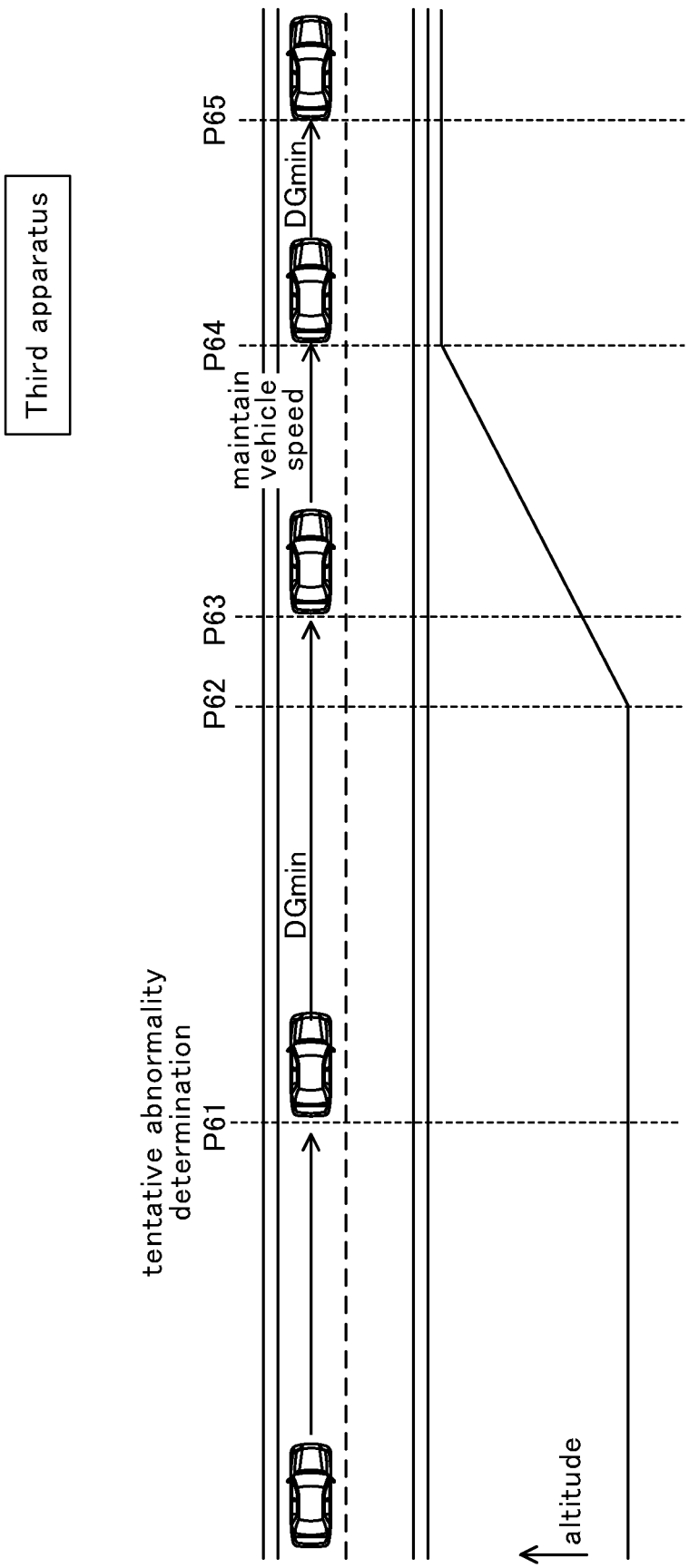
FIG. 13 is a drawing for describing an operation of a vehicle control apparatus (third apparatus) according to a third embodiment of the present disclosure.

When the tentative anormal determination is made, similarly to the first apparatus, the third apparatus mildly/generously decelerates the vehicle at the minimum deceleration DGmin (refer to a point P61 to a point P63, shown in FIG. 13). If the lane in which the vehicle is traveling is the steep ascending slope when the vehicle speed SPD goes down to an immediately-before-stop-vehicle speed SPDth, the third apparatus maintains the vehicle speed at that time point (i.e., the immediately-before-stop-vehicle speed SPDth) (refer to a point P63 to a point P64, shown in FIG. 13). Thereafter, when the lane in which the vehicle is traveling is no longer the steep ascending slope, the third apparatus mildly/generously decelerates the vehicle at the minimum deceleration DGmin until the vehicle completely stops (refer to a point P64 to a point P65, shown in FIG. 13).

Figure 14:
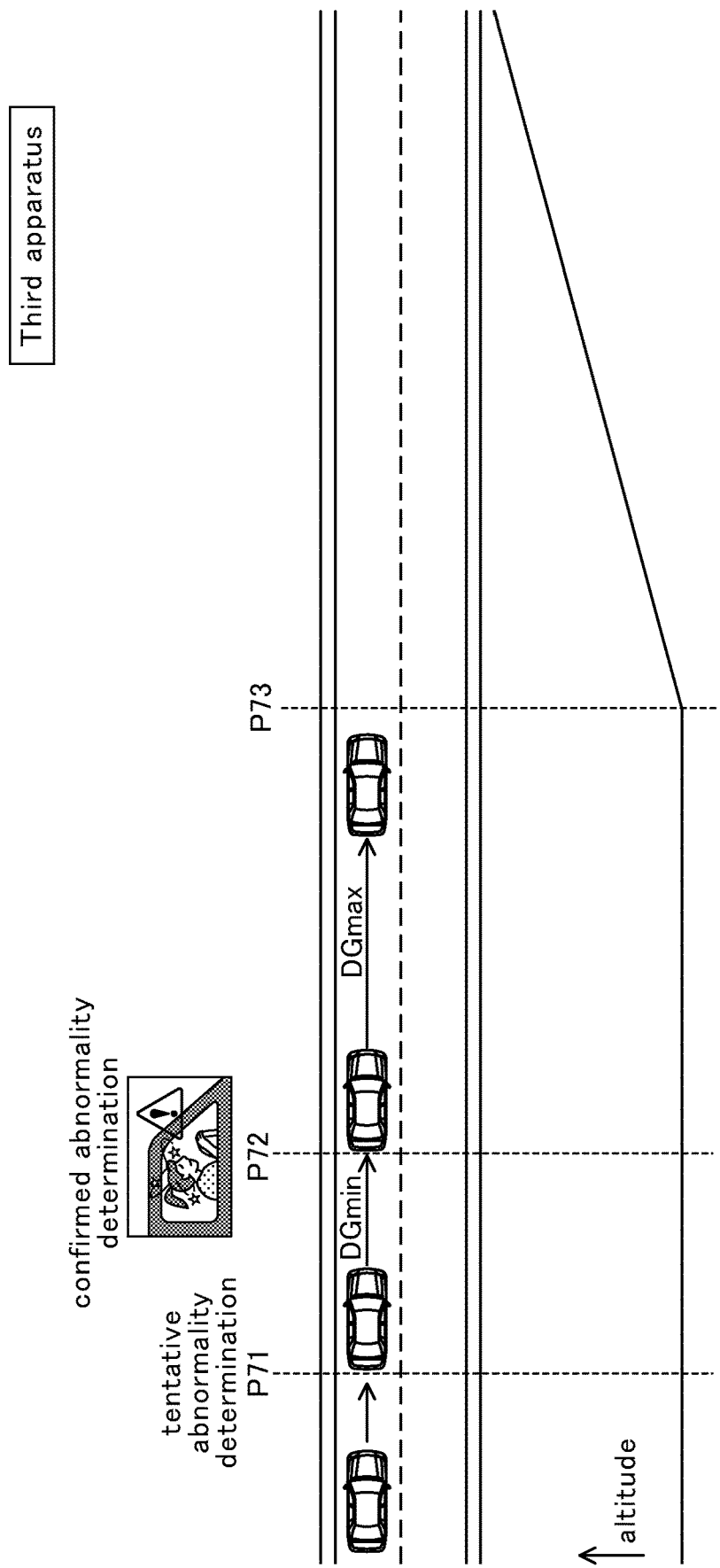
FIG. 14 is a drawing for describing an operation of the third apparatus.

When the confirmed abnormality determination is made, the third apparatus decelerates the vehicle at the normal deceleration DGnor. However, when it is predicted that the control limit of the lane keeping control will come before the time point at which the vehicle completely stops in the case where the vehicle is decelerated at the normal deceleration DGnor from when the confirmed abnormality determination is made, the third apparatus decelerates the vehicle at the maximum deceleration DGmax greater than the normal deceleration DGnor, similarly to the second apparatus. In addition, even when it is not predicted that the control limit of the lane keeping control will come before the time point at which the vehicle completely stops in the case where the vehicle is decelerated at the normal deceleration DGnor from when the confirmed abnormality determination is made, the third apparatus determines whether or not it can completely stop the vehicle before the vehicle enters the steep ascending slope in a case where the vehicle is decelerated at the maximum deceleration DGmax when it is predicted that the vehicle will enter the steep ascending slope before the time point at which the vehicle completely stops in the case where the vehicle is decelerated at the normal deceleration DGnor from when the confirmed abnormality determination is made. When it is determined that the vehicle can be completely stopped before the vehicle enters the steep ascending slope in the case where the vehicle is decelerated at the maximum deceleration DGmax, third apparatus decelerates the vehicle at the maximum deceleration DGmax (refer to a point P72 to a point P73, shown in FIG. 14).

Figure 15:
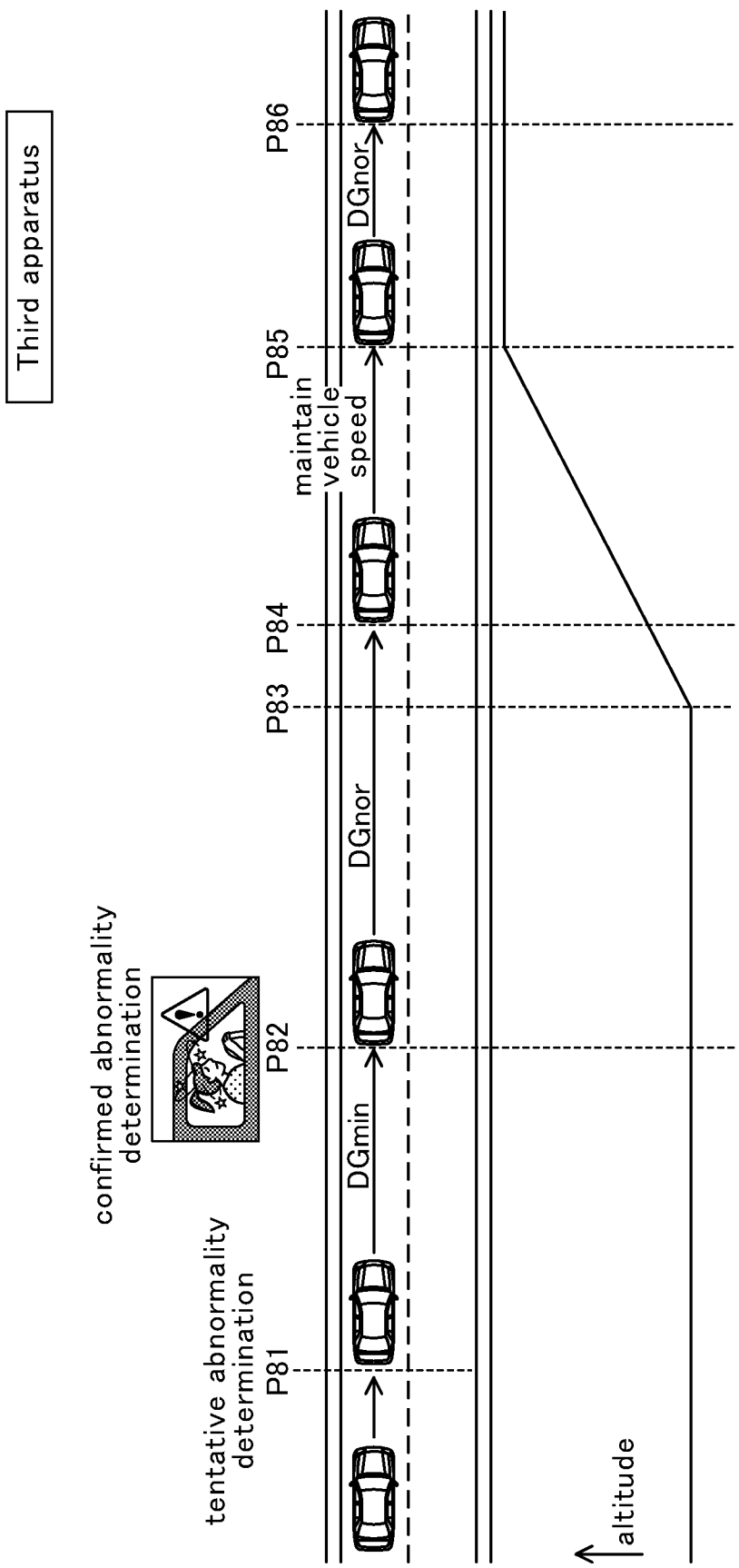
FIG. 15 is a drawing for describing an operation of the third apparatus.

Whereas, in the case where it is not predicted that the control limit of the lane keeping control will come before the time point at which the vehicle completely stops in the case where the vehicle is decelerated at the normal deceleration DGnor from when the confirmed abnormality determination is made, the third apparatus decelerates the vehicle at the normal deceleration DGnor if it is predicted that the vehicle will enter the steep ascending slope before the time point at which the vehicle completely stops in the case where the vehicle is decelerated at the maximum deceleration DGmax from when the confirmed abnormality determination is made (refer to a point P82 to a point P84, shown in FIG. 15). When the lane in which the vehicle is traveling at the time point at which the vehicle speed SPD goes down to the immediately-before-stop-vehicle speed SPDth is the steep ascending slope, the third apparatus maintains the vehicle speed at that time point (refer to a point P84 to a point P85, shown in FIG. 15). Thereafter, when the lane in which the vehicle is traveling is no longer the steep ascending slope, the third apparatus decelerates the vehicle at the normal deceleration speed DGnor until the vehicle completely stops (refer to a point P85 to a point P86, shown in FIG. 15).

(Specific Operations)

Figure 16:
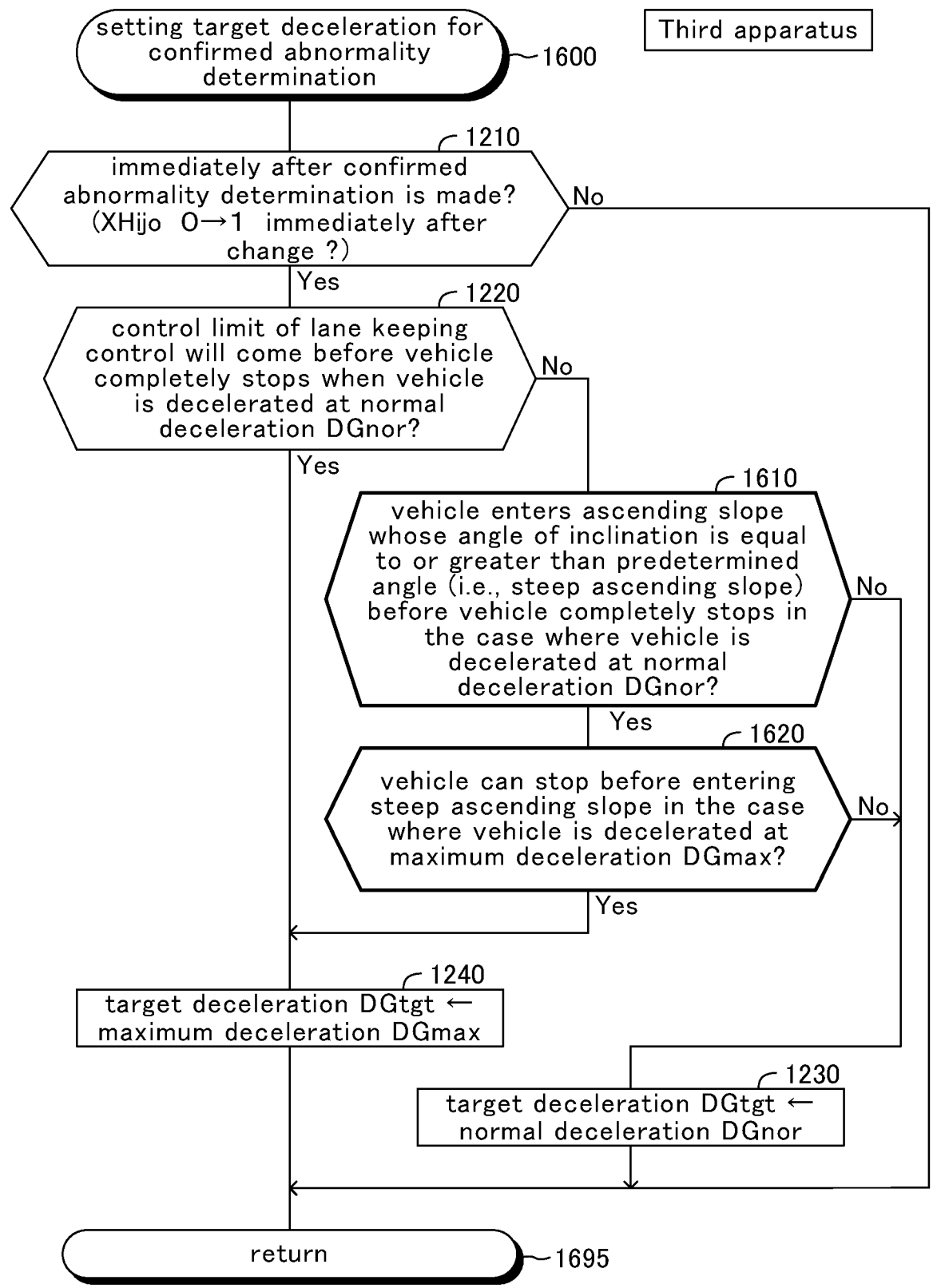
FIG. 16 is a flowchart illustrating a routine executed by a CPU of the third apparatus.
Figure 17:
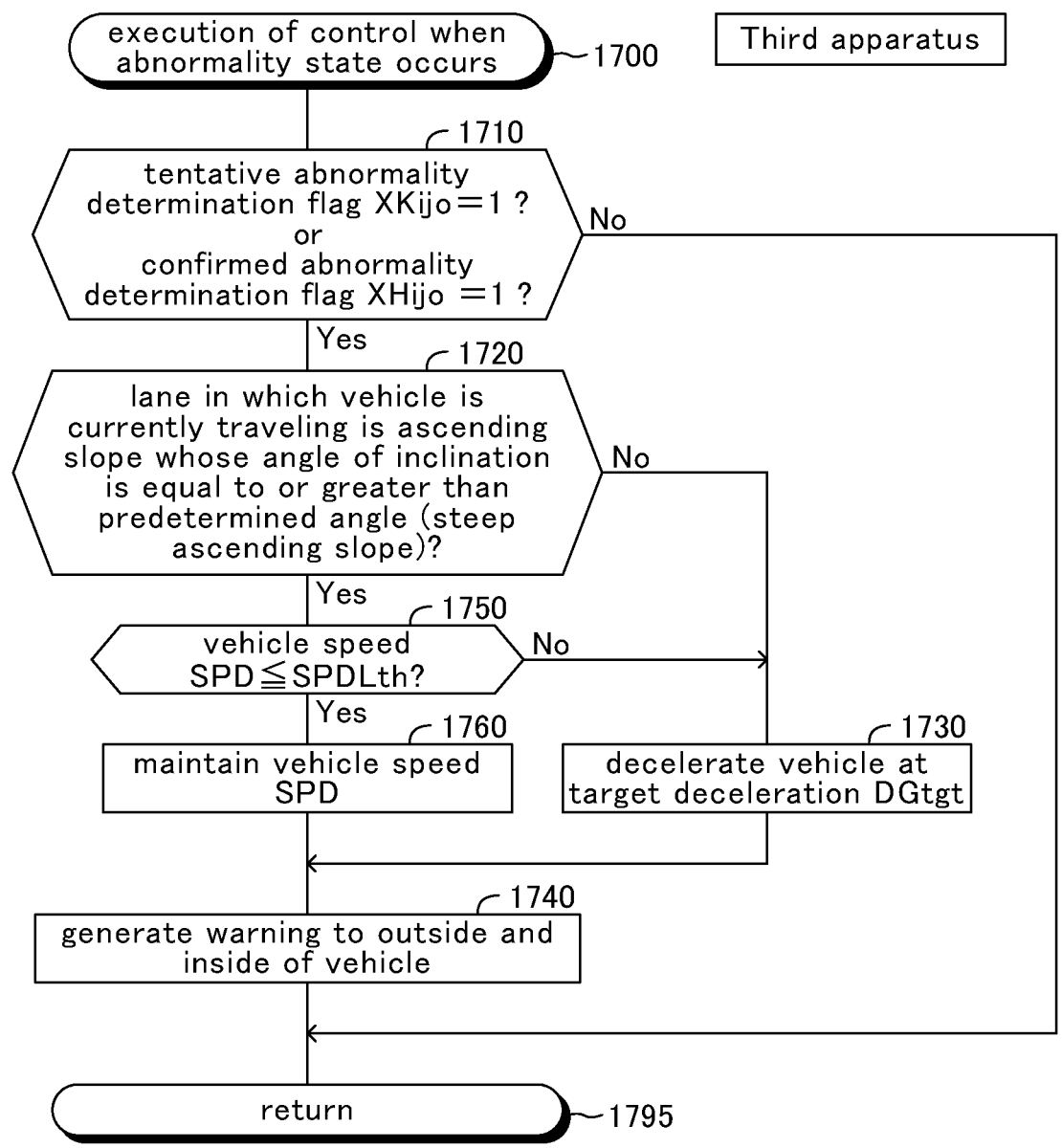
FIG. 17 is a flowchart illustrating a routine executed by the CPU of the third apparatus.

The third apparatus is different from the first apparatus only in that the CPU of the driving assistance ECU 10 of the third apparatus executes a routine shown by a flowchart in FIG. 16 in place of the routine shown in FIG. 12, and executes a routine shown by a flowchart in FIG. 17 in place of the routine shown in FIG. 9. These differences will be mainly described, hereinafter.

When an appropriate time point comes, the CPU starts processing from step 1600 in FIG. 16, and proceeds to step 1210. At step 1210, the CPU determines whether or not the present time point is immediately after the confirmed abnormality determination is made. This step is the same as the step 1210 shown in FIG. 12. When the present time point is not immediately after the confirmed abnormality determination is made, the CPU makes a "No" determination at step 1210, and directly proceeds to step 1695 to terminate the present routine tentatively.

Whereas, when the present time point is immediately after the confirmed abnormality determination is made, the CPU makes a "Yes" determination at step 1210 shown in FIG. 16, and proceeds to step 1220. At step 1220, the CPU determines whether or not the control limit condition of the lane keeping control becomes satisfied before the vehicle completely stops in the case where the vehicle is decelerated at the normal deceleration DGnor from the current vehicle speed. This step is the same as the step 1220 shown in FIG. 12.

When it is predicted that the control limit of the lane keeping control will come, the CPU makes a "Yes" determination at step 1220 shown in FIG. 16, and proceeds to step 1240. At step 1240, the CPU sets the value of the target deceleration DGtgt to the maximum deceleration DGmax. Thereafter, the CPU proceeds to step 1695 to terminate the present routine tentatively.

When it is predicted that the control limit of the lane keeping control will not come, the CPU makes a "No" determination at step 1220 shown in FIG. 16, and proceeds to step 1610. At step 1610, the CPU determines whether or not the lane (i.e., the traveling lane) in which the vehicle is traveling enters "an ascending slope (a steep ascending slope) whose angle of inclination is equal to or greater than a predetermined angle" before the vehicle completely stops in the case where the vehicle is decelerated at the constant normal deceleration DGnor from the current vehicle speed. It should be noted that CPU obtains the angle of inclination of the traveling lane, based on information from the map data base 22 through the navigation ECU 20.

When the lane in which the vehicle is traveling enters "the ascending slope (the steep ascending slope) whose angle of inclination is equal to or greater than the predetermined angle", the CPU makes a "Yes" determination at step 1610, and proceeds to step 1620. At step 1620, the CPU determines whether or not the vehicle can be completely stopped before the lane in which the vehicle is traveling changes into the steep ascending slope in the case where the vehicle is decelerated at the maximum deceleration DGmax from the present vehicle speed.

When the vehicle can be completely stopped before the lane in which the vehicle is traveling changes into the steep ascending slope, the CPU makes a "Yes" determination at step 1620, and proceeds to step 1240. At step 1240, the CPU sets the value of the target deceleration DGtgt to the maximum deceleration DGmax. Thereafter, the CPU proceeds to step 1695 to terminate the present routine tentatively.

Whereas, when the lane in which the vehicle is traveling does not change into the steep ascending slope in the case where the vehicle is decelerated at the constant normal deceleration DGnor, the CPU makes a "No" determination at step 1610, and proceeds to step 1230. At step 1230, the CPU sets the value of the target deceleration to the normal deceleration DGnor. Thereafter, the CPU proceeds to step 1695 to terminate the present routine tentatively.

On the other hand, when the lane in which the vehicle is traveling changes into the steep ascending slope in the case where the vehicle is decelerated at the constant normal deceleration DGnor, and when the vehicle cannot be completely stopped before the lane in which the vehicle is traveling changes into the steep ascending slope in the case where the vehicle is decelerated at the maximum deceleration DGmax from the current vehicle speed, the CPU makes a "Yes" determination at step 1610 and makes a "No" determination at step 1620. Then, the CPU proceeds to step 1230 so as to set the value of the target deceleration to the normal deceleration DGnor. Thereafter, the CPU proceeds to step 1695 to terminate the present routine tentatively.

When an appropriate time point comes, the CPU starts processing from step 1700 in FIG. 17, and proceeds to step 1710. At step 1710, the CPU determines whether or not either one of the value of the tentative abnormality determination flag XKijo and the value of the confirmed abnormality determination flag XHijo is "1". When both of the value of the tentative abnormality determination flag XKijo and the value of the confirmed abnormality determination flag XHijo are "0", the CPU makes a "No" determination at step 1710, and directly proceeds to step 1795 to terminate the present routine tentatively.

Whereas, when either one of the value of the tentative abnormality determination flag XKijo and the value of the confirmed abnormality determination flag XHijo is "1", the CPU makes a "Yes" determination at step 1710, and proceeds to step 1720.

At step 1720, the CPU determines whether or not the lane in which the vehicle is currently traveling is the ascending slope (the steep ascending slope) whose angle of inclination is equal to or greater than the predetermined angle". When the lane in which the vehicle is currently traveling is not the steep ascending slope, the CPU makes a "No" determination at step 1720, and proceeds to step 1730.

At step 1730, the CPU decelerates the vehicle in such a manner that the actual deceleration of the vehicle becomes equal to (coincides with) the target deceleration DGtgt. Subsequently, the CPU proceeds to step 1740 so as to generate a warning to the outside and the inside of the vehicle. The step 1740 is a step for executing the same process (outside and inside vehicle warning process) as the step 930 shown in FIG. 9. Thereafter, the CPU proceeds to step 1795 to terminate the present routine tentatively.

Whereas, if the lane in which the vehicle is currently traveling is the steep ascending slope when the CPU proceeds to step 1720, the CPU makes a "Yes" determination at step 1750. At step 1750, the CPU determines whether or not the vehicle speed SPD is equal to or lower than the immediately-before-stop-vehicle speed SPDth. When the vehicle speed SPD is neither equal to nor lower than the immediately-before-stop-vehicle speed SPDth, the CPU makes a "No" determination at step 1750, and executes the processes of step 1730 and step 1740. Thereafter, the CPU proceeds to step 1795 to terminate the present routine tentatively.

Whereas, when the vehicle speed SPD is equal to or lower than the immediately-before-stop-vehicle speed SPDth, the CPU makes a "Yes" determination at step 1750, and proceeds to step 1760. At step 1760, the CPU controls the vehicle speed SPD in such a manner that the vehicle speed SPD is maintained at the current vehicle speed. Thereafter, the CPU executes the process of step 1740, and proceeds to step 1795 to terminate the present routine tentatively.

Consequently, the vehicle travels at the immediately-before-stop-vehicle speed SPDth. After the vehicle passes through the steep ascending slope, the CPU makes a "No" determination at step 1720, and proceeds to step 1730. This decelerates the vehicle in such a manner that the actual deceleration becomes equal to (coincides with) the target deceleration DGtgt.

In this manner, the third apparatus can prevent the vehicle from being completely stopped at the steep ascending slope, when either one of the value of the tentative abnormality determination flag XKijo and the value of the confirmed abnormality determination flag XHijo is "1".

As has been described, each of the vehicle control apparatuses according to each of the embodiments and modifications can decelerate the vehicle to stop the vehicle at an appropriate deceleration in accordance with the determination result of the driver (namely, depending on whether the tentative anormal determination is made, and/or depending on whether the confirmed anormal determination is made) when the tentative anormal determination is made and/or when the confirmed anormal determination is made, even when the control limit of the lane keeping control comes so that the lane keeping control is stopped (canceled)

The present disclosure should not be limited to the above-described embodiments and the modifications, and may employ various other modifications within the scope of the present disclosure.

For example, whether or not the driver has fallen into the abnormal state can be determined depending on whether or not the confirmation button 80 is operated. Specifically, at step 640 shown in FIG. 6, the CPU displays a message urging the driver to operate the confirmation button 80 on the meter display 64.

When the confirmation button 80 is not operated for more than a first time in this situation, the CPU determines that it is likely that the driver has fallen into the abnormal state (i.e., makes the tentative abnormality determination). In addition, after that, when the confirmation button is not operated for more than a second time, the CPU determines that the driver has fallen into the abnormal state (i.e., makes the confirmed abnormality determination). It should be noted that, when the confirmation button 80 is operated before the first time elapses, or before the second time elapses, the CPU proceeds to step 615 and step 620. In this manner, the signal from the confirmation button 80 functions as the driver state parameter representing the state of the driver of the vehicle.

As another modification, whether or not the driver has fallen into the abnormal state can be determined by applying a so-called driver monitor technique disclosed in Japanese Patent Application Laid-Open No. 2013-152700. More specifically, this modification takes an image of the driver using a camera arranged at a member inside of the cabin (for example, the steering wheel or a pillar), and monitor a direction of a line of sight of the driver or a direction of a face of the driver using the taken image.

When the direction of the line of sight of the driver or the direction of the face of the driver continues to be an orientation they do not normally direct to during a normal driving for a long time for more than the tentative abnormality determination time threshold TKijoth, the modification sets the value of the tentative abnormality determination flag XKijo to "1". In addition, when the direction of the line of sight of the driver or the direction of the face of the driver continues to be the orientation they do not normally direct to during the normal driving for a long time for more than the confirmed abnormality determination time threshold THijoth, the modification sets the value of the tentative abnormality determination flag XKijo to "0" and sets the value of the confirmed abnormality determination flag XHijo to "1". In this manner, the direction of the line of sight of the driver or the direction of the face of the driver functions as the driver state parameter representing the state of the driver of the vehicle.

Each of the above-described embodiments and modifications makes the tentative abnormality determination and the confirmed abnormality determination while the lane keeping control is being executed, however, may make them regardless of whether or not the lane keeping control is being executed. In this case, step 610 shown in FIG. 6 is omitted, and CPU proceeds to step 625 when the CPU makes a "Yes" determination at step 605. Furthermore, in this case, at step 1010 shown in FIG. 10, the CPU determines that the lane keeping control permission condition is satisfied, not only when all of the above-described conditions A1 to A4 are satisfied, but also when the following the condition A5 as well as all of the above-described conditions A2 to A4 are satisfied.

(condition A5) at least of one of the value of the tentative abnormality determination flag XKijo and the value of the confirmed abnormality determination flag XHijo is "1".

In addition, each of the above-described embodiments and modifications may decelerate the vehicle at the maximum deceleration DGmax, when it is determined, at a time point at which the value of the tentative abnormality determination flag XKijo is changed from "0" to "1", that the vehicle will enter a vehicle-no-entry-section in the case where the vehicle is decelerated at the minimum deceleration DGmin. It should be noted that the CPU may obtain position information on the vehicle-no-entry-section based on information obtained through the navigation ECU 20 and an unillustrated communication device.

Each of the above-described embodiments and modifications can be applied to an autonomous control vehicle.

What is claimed is:

1. A vehicle control apparatus comprising:
a lane marker information obtaining device, including a camera configured to obtain image data by taking a picture of a scene in front of a vehicle, that obtains, based on said image data, lane marking information including information on a lane marking that defines a traveling lane that is a lane in which said vehicle is traveling and information indicative of a positional relationship in a lane width direction between said lane marking and said vehicle;
a vehicle speed adjusting actuator configured to change a vehicle speed that is a speed of said vehicle;
a steering actuator configured to vary a steering angle of said vehicle;
a traveling state sensor configured to obtain a traveling state parameter indicative of a traveling state of said vehicle;
a driver state sensor configured to obtain a driver state parameter indicative of a state of said driver of said vehicle:
a position information obtaining device configured to obtain a present position parameter indicative of a present position of said vehicle;
a lane information obtaining device configured to obtain, based on said present position of said vehicle, lane information including a parameter indicative of a shape of said traveling lane; and
a control unit configured to perform a lane keeping control to control said steering actuator based on said lane marking information in such a manner that said vehicle travels along said traveling lane, and to stop performing said lane keeping control when determining, based on at least said traveling state parameter, that a predetermined control limit condition for said lane keeping control becomes satisfied while said lane keeping control is being performed, wherein, said control unit is configured to:
determine, based on said driver state parameter, whether or not a confirmed abnormal state in which it can be confirmed that said driver has fallen into an abnormal state where said driver is unable to drive said vehicle has been occurring,
when it is determined that said confirmed abnormal state has been occurring, predict, based on said traveling state parameter, said present position parameter, and said lane information, whether or not a specific state in which said control limit condition is satisfied before said vehicle completely stops in a case where said vehicle is decelerated at a first deceleration will occur;

when it is predicted that said specific state will occur, control said vehicle speed adjusting actuator in such a manner that said vehicle is decelerated at a second deceleration whose absolute value is greater than an absolute value of said first deceleration; and when it is predicted that said specific state will not occur, control said vehicle speed adjusting actuator in such a manner that said vehicle is decelerated at said first deceleration.

2. The vehicle control apparatus according to claim 1, wherein, said control unit is configured to:

determine, based on said driver state parameter, whether or not a tentative abnormal state has been occurring, said tentative abnormal state being a state in which it is likely that said driver has fallen into said abnormal state but it cannot be determined that said confirmed abnormal state has been occurring; and when it is determined that said tentative abnormal state has been occurring, control said vehicle speed adjusting actuator in such a manner that said vehicle is decelerated at a third deceleration whose absolute value is equal to or smaller than said absolute value of said first deceleration.

3. The vehicle control apparatus according to claim 1, wherein, said control unit is configured to determine whether or not said confirmed abnormal state has been occurring, while said lane keeping control is being executed.

4. The vehicle control apparatus according to claim 2, wherein, said control unit is configured to determine whether or not said confirmed abnormal state has been occurring and determine whether or not said tentative abnormal state has been occurring, while said lane keeping control is being executed.

5. The vehicle control apparatus according to claim 1, wherein, said control unit is configured to, even when it is determined that said specific state will not occur, control said vehicle speed adjusting actuator in such a manner that said vehicle is decelerated at said second deceleration, when it is predicted that said vehicle will enter a steep ascending slope whose angle of inclination is equal to or greater than a predetermined angle before said vehicle completely stops in a case where said vehicle is decelerated at said first deceleration, and when it is determined that said vehicle can be completely stopped before said vehicle enters said steep ascending slope in a case where said vehicle is decelerated at said second deceleration.

* * * * *